United States Patent [19]

Rosen

[11] Patent Number: 5,745,886
[45] Date of Patent: Apr. 28, 1998

[54] TRUSTED AGENTS FOR OPEN DISTRIBUTION OF ELECTRONIC MONEY

[75] Inventor: Sholom S. Rosen, New York, N.Y.

[73] Assignee: Citibank, N.A., New York, N.Y.

[21] Appl. No.: 488,248

[22] Filed: Jun. 7, 1995

[51] Int. Cl.$^6$ ................................................. G06F 17/60
[52] U.S. Cl. ........................... 705/39; 705/41; 235/375
[58] Field of Search ........................ 395/201; 235/379, 235/380, 375; 380/23–25; 705/1, 35, 38–42

[56] References Cited

U.S. PATENT DOCUMENTS

| | | | |
|---|---|---|---|
| 4,443,027 | 4/1984 | McNeely et al. | 283/83 |
| 4,454,414 | 6/1984 | Benton . | |
| 4,529,870 | 7/1985 | Chaum et al. . | |
| 4,644,493 | 2/1987 | Chandra et al. | 380/4 |
| 4,817,140 | 3/1989 | Chandra et al. | 380/4 |
| 4,823,264 | 4/1989 | Deming et al. . | |
| 4,916,738 | 4/1990 | Chandra et al. | 380/25 |
| 4,926,480 | 5/1990 | Chaum | 380/23 |
| 4,972,175 | 11/1990 | MacPherson . | |
| 4,999,806 | 3/1991 | Chernow et al. | 395/712 |
| 5,109,413 | 4/1992 | Comerford et al. | 380/4 |
| 5,117,457 | 5/1992 | Comerford et al. | 340/652 |
| 5,131,039 | 7/1992 | Chaum | 380/23 |
| 5,148,534 | 9/1992 | Comerford | 711/164 |
| 5,162,989 | 11/1992 | Matsuda | 395/712 |
| 5,185,717 | 2/1993 | Mori . | |
| 5,202,921 | 4/1993 | Herzberg et al. | 380/23 |
| 5,247,578 | 9/1993 | Pailles et al. . | |
| 5,276,311 | 1/1994 | Hennige | 235/380 |
| 5,276,736 | 1/1994 | Chaum | 380/24 |
| 5,319,705 | 6/1994 | Halter et al. . | |
| 5,386,458 | 1/1995 | Nair et al. | 379/91.01 |
| 5,416,840 | 5/1995 | Cane et al. . | |
| 5,557,518 | 9/1996 | Rosen . | |

FOREIGN PATENT DOCUMENTS

| | | |
|---|---|---|
| 0172670A2 | 2/1986 | European Pat. Off. . |
| 419106A1 | 3/1991 | European Pat. Off. . |
| 474360A2 | 3/1992 | European Pat. Off. . |
| A 0 501 697 | 9/1992 | European Pat. Off. . |
| 0569816A2 | 11/1993 | European Pat. Off. . |
| 0380377B1 | 10/1994 | European Pat. Off. . |
| 2257557 | 1/1993 | United Kingdom . |
| WO9308545 | 4/1993 | WIPO . |
| WO 93 10503 | 5/1993 | WIPO . |
| WO9401825A | 1/1994 | WIPO . |
| WO 95 30211 | 11/1995 | WIPO . |

OTHER PUBLICATIONS

Chaum, "Achieving Electronic Privacy", Scientific American, August 1992.
"Abyss: A Trusted Architecture for Software Protection", S.R. White and L. Comerford, IEEE 1987.
"Public Protection of Software", A. Herzberg and S.S. Pinter, *ACM Transactions on Computer Systems*, vol. 5, No. 4, Nov. 1987, pp. 371–393.

(List continued on next page.)

*Primary Examiner*—Gail O. Hayes
*Assistant Examiner*—Frantzy Poinvil
*Attorney, Agent, or Firm*—Morgan & Finnegan, L.L.P.

[57] ABSTRACT

A system for the open distribution of electronic money is provided having a customer trusted agent associated with a first money module, a merchant trusted agent that establishes a first cryptographically secure session with the customer trusted agent and associated with a second money module. Where the money modules establish a second cryptographically secure session. The customer trusted agent provides electronic money purchase or sale information and an account credential to the merchant trusted agent, and the merchant trusted agent provides a receipt ticket to the customer trusted agent. The merchant trusted agent accesses an authorization network and initiates an authorization process using information from the electronic money purchase or sale information and the account credential. Upon receiving authorization, the merchant trusted agent initiates a transfer of electronic money from the second money module to the first money module in the case of a purchase, or initiates a transfer of electronic money from the first money module to the second money module in the case of a sale.

23 Claims, 41 Drawing Sheets

Trusted Agent/Money Module Interaction

OTHER PUBLICATIONS

"Security Without Identification: Card Computers To Make Big Brother Obsolete", D. Chaum, 1987.

"Trust in the New Information Age", D.P. Maher, *AT&T Technical Journal*, Sep./Oct. 1994, pp. 9–16.

"Dyad: A System for Using Physically Secure Coprocessors", J.D. Tygar and B. Yee. No date.

"Trusted Devices as applied to Corporate Key Escrow", F. Sudia, Jan. 14, 1994.

"WaveMeter Chip Provides Digital Money", M. Slater, *Microprocessor Report*, Apr. 18, 1994.

"Internet Billing Service Design and Prototype Implementation", Marvin A. Sirbu, *IMA Intellectual Property Project Proceedings*, vol. 1, Issue 1, Jan. 1994.

"Le paiement électronique", P. Rémery, J.C. Pailles and F. Lay, *L'Echo des Recherches*, No. 134, 4° trimester 1988–original French version and English translation.

"Value Exchange Systems Enabling Security and Unobservability", Holger Bürk and Andreas Pfitzmann, *Computers & Security*, 9 (1990), pp. 715–721.

"Proxy–Based Authorization and Accounting for Distributed Systems", B. Clifford Neuman, *Proceedings of the 13th International Conference on Distributed Computing Systems*, Pittsburgh, May 1993.

"Online Cash Checks", D. Chaum, *Scientific Publications*, Online: david@digicash.nl. No date.

"Achieving Electronic Privacy", David Chaum, *Scientific American*, Aug. 1992, pp. 96–101.

Trusted Agent Components

Commit

Abort

Authorization-Based Purchase/ Sale of Electronic Money (Cont.)

Authorization-Based Purchase/ Sale of Electronic Money (Cont.)

Authorization-Based Purchase/Sale of Electronic Money (Cont.)

Establish Session (Cont.)

Establish Session (Cont.)

Check Credential

Abort Transaction

Money Module Payment

Money Module Payment (Cont.)

Message Encryption Layers

Establish Session (MM)

Establish Session (MM) (Cont.)

Establish Session (MM) (Cont.)

Send Routed Message

Send MM/TA Message

Send TA/MM Message

Abort Transaction (MM) (Cont)

Send E-Routed Message

TRUSTED AGENTS FOR OPEN DISTRIBUTION OF ELECTRONIC MONEY

FIELD OF THE INVENTION

The present invention relates to a system for facilitating the distribution of electronic money. In particular, the system utilizes tamper-proof electronic units, referred to as "trusted agents", in combination with money modules to create a secure transaction environment in which customers may purchase or sell electronic money from merchants using credit or debit card credentials.

BACKGROUND OF THE INVENTION

Numerous electronic payment systems are currently being developed to accommodate the growth in electronic commerce. One method of electronic payment is described in my U.S. patent applications Ser. Nos. 07/794,112, now U.S. Pat. No. 5,453,601 filed Nov. 15, 1991, 08/234,461 filed Apr. 28, 1994, now U.S. Pat. No. 5,557,518 and 08/427,287 filed Apr. 21, 1995, now pending the disclosures of which are incorporated herein by reference. These applications disclose an electronic monetary system for implementing electronic money payments as an alternative medium of exchange to cash, checks, credit cards, debit cards, and electronic funds transfers. In particular, the described system uses money modules packaged in tamper-proof housings to store and transfer electronic notes. Money module payments may be either real-time, off-line payments between money modules (e.g., between a money module contained within a customer's "electronic wallet" and a money module contained within a merchant's point-of-sale terminal), or on-line payments for network services such as information retrieval and telephone calls, or for purchasing airline tickets, theater tickets, etc.

The trusted agents discussed herein are fully described in my co-pending U.S. patent application Ser. No. 08/234,461, filed Apr. 28, 1994, the disclosure of which is incorporated herein by reference. That application describes a system for enabling the secure delivery of electronic merchandise with real-time anonymous payment or authorization-based payment. The system allows both the customer and merchant to feel secure that their interests are being served.

Cash is widely available from banks and merchants. Electronic money, just like cash, needs to be widely available in order to gain general acceptance. The present invention describes how trusted agents can facilitate the distribution of electronic money through merchants which are connected to a payment authorization network. This distribution transaction can be accomplished locally or remotely from the merchant, greatly increasing the distribution points beyond the banking network. Also, the disclosed distribution system can exchange one monetary unit for another. For example, one could obtain U.S. dollars from a British pound account.

My electronic monetary system application Ser. No. 07/794,112 disclosed how cash can be exchanged for electronic money and vice-versa. Such a transaction was accomplished locally at a bank teller or ATM machine since cash was dispensed. Electronic money could also be dispensed locally if an ATM or point of sale terminal is modified to dispense the electronic money and the terminal could guarantee the security of the transaction. The present invention describes how electronic money can be processed remotely and securely from a merchant without a special terminal such as an ATM or POS terminal. For the customer, the security of the transaction is assured by the use of a trusted agent. There is no need for special terminals, which unbeknown to the customer, could have Trojan horse processes which take the customer's electronic money or capture his secret bank access information.

SUMMARY OF THE INVENTION

It is an object of the present invention to provide a secure system using trusted agents for the distribution of electronic money through merchants or banks connected to a payment authorization network.

It is a further object of the present invention to provide a system for buying or selling electronic money remotely and securely from a merchant without a special terminal.

It is yet a further object of the present invention to provide a system that allows a merchant to satisfy a customer's need for electronic money even if the merchant does not have electronic money initially in his possession.

It is yet a further object of the invention to increase the distribution of electronic money without the need to sign-up numerous banks to participate in the electronic monetary system.

In the present invention, a system for the open distribution of electronic money is provided having a customer trusted agent, a first money module associated with the customer trusted agent and with which it securely communicates, a merchant trusted agent that establishes a first cryptographically secure session with the customer trusted agent, and a second money module associated with the merchant trusted agent with which it securely communicates. The first and second money modules establish a second cryptographically secure session. The customer trusted agent provides electronic money purchase information and an account credential to the merchant trusted agent, and the merchant trusted agent provides a receipt ticket to said customer trusted agent. The merchant trusted agent accesses an authorization network and initiates an authorization process using information from the electronic money purchase information and the account credential. Upon receiving authorization, the merchant trusted agent initiates a transfer of electronic money from the second money module to the first money module.

In the event the merchant trusted agent does not have sufficient funds in its associated money module, it attempts to acquire electronic money from affiliated transaction devices or by withdrawing electronic money from a bank at which the merchant has an account and which is an electronic money provider. The described system architecture and protocols also support the sale of electronic money by the customer to the merchant, which is analogous to a deposit transaction.

DESCRIPTION OF THE DRAWINGS

The invention will be described in greater detail below with reference to the attached drawings, of which.

DESCRIPTION OF THE PREFERRED EMBODIMENT

As described in my co-pending U.S. application Ser. No. 08/234,461, a trusted agent is a combination of hardware and software components. It is tamper-proof and contains secure protocols which cooperate with a money module to synchronize secure payment to delivery. Money modules are tamper-proof devices capable of storing and transferring electronic money. The electronic money is preferably in the form of electronic notes that are representations of currency or credit. Money modules are also capable of establishing cryptographically secure communication sessions with other devices. The preferred embodiment of the present invention utilizes the transaction money modules described in my co-pending U.S. patent applications Ser. Nos. 07/794,112 and 08/427,287.

Figure 1:
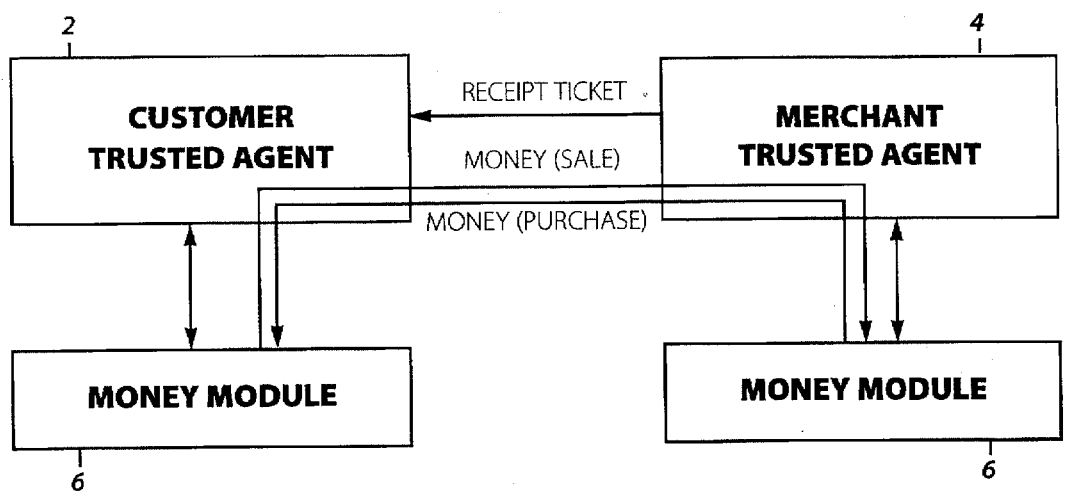
FIG. 1 is a diagram showing the trusted agent/money module interaction.

The trusted agents when making purchases over a network, exchange electronic merchandise and payment. In the present invention, as shown in FIG. 1, the merchant's trusted agent 4 (MTA) sends a receipt ticket to the customer's trusted agent 2 (CTA). In return, the customer's money module 6 sends electronic money to the merchant's money module 6 via CTA 2 and MTA 4 when the customer is selling electronic money. If the customer is purchasing electronic money, then the electronic money flows from the merchant to the customer.

Tickets

Figure 2:
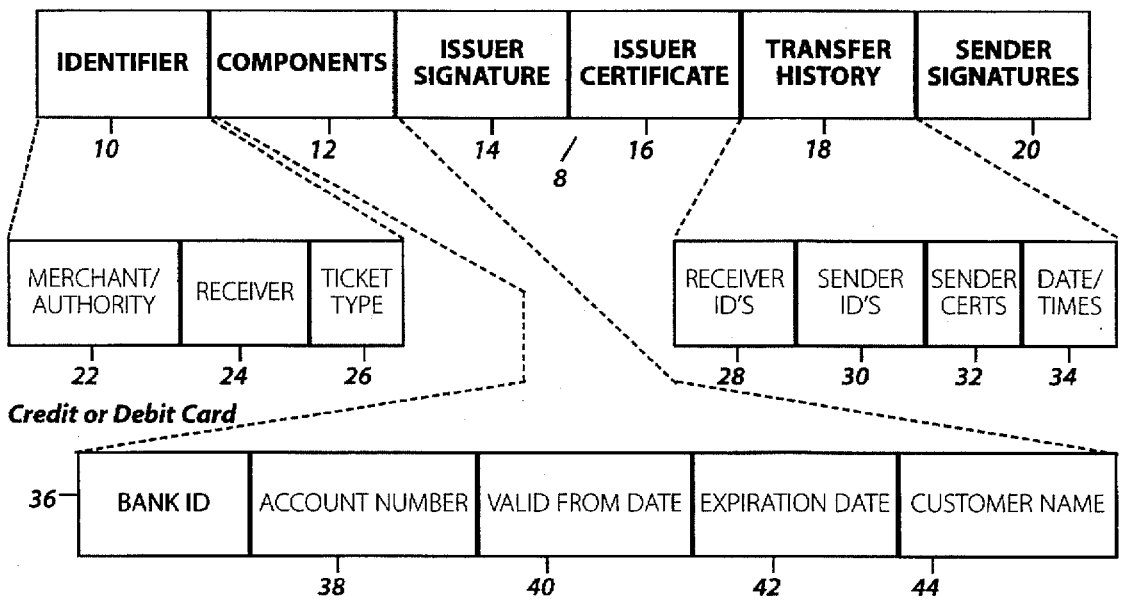
FIG. 2 illustrates the sections and fields of various tickets.

Referring to FIGS. 1 and 2, a ticket 8 is an electronic item created by a MTA 4 and transferred to a CTA 2 during a transaction. Tickets may be thought of as the property of the trusted agents. A customer whose CTA 2 has just received a ticket 8 may only use that ticket upon successful completion of the transaction.

As described in the Ser. No. 08/234,461 application, trusted agents support a variety of ticket types used for various purposes. However, of primary importance for the present invention are credential tickets and electronic money purchase receipt tickets. A credential ticket identifies the "owner" and permits specific privileges. Examples of credentials include credit and debit cards. A credit or debit card ticket can be presented for authorization-based payment. A customer's receipt ticket identifies the particulars of a distribution transaction (buying or selling of electronic money), and may be used by the customer in a dispute scenario.

FIG. 2 shows a preferred embodiment of a ticket 8 in which the ticket is comprised of six major sections: Identifier 10, Components 12, Issuer Signature 14, Issuer Certificate 16, Transfer History 18 and Sender Signatures 20. The sections, in turn, are comprised of various information containing fields.

The Identifier section 10 has a field 22 which holds information that identifies the merchant or authority creating the ticket. Such information, for example the merchant's or authority's name, is copied from a merchant or authority credential held by the ticket issuer. The field 22 also contains the expiration date of the merchant or authority credential. A field 24 contains the receiving trusted agent's identification number. The field 24 also contains the expiration date of the ticket receiver's trusted agent credential. A field 26 designates the ticket type (e.g., credit or debit card ticket, receipt ticket, etc.).

The Components section 12 contains the basic ticket content which varies depending upon the ticket type and its specific purpose. FIG. 2 shows examples of components found in different ticket types.

A credential ticket such as a credit or debit card may have: a Bank ID field 36 specifying the credential owner's bank; an Account Number field 38; a Valid From Date field 40; an Expiration Date field 42; and a Customer Name field 44.

An electronic money purchase receipt ticket may have: a Bank ID field 46 specifying the bank identified in the customer's credential; an Account Number field 38 specifying the account number identified in the customer's credential; a Type of Transaction field 50 specifying whether the transaction is an electronic money purchase or sale; an Authorization Amount field 52; an Amount Sent or Received field 54; a Merchant Fee field 56; and a Date of Transaction field 58. The authorization amount equals the amount received plus the merchant's fee for the purchase transaction or the amount sent minus the merchant's fee for a sale.

The Issuer Signature section 14 of a ticket 8 holds a digital signature, formed by the ticket creator, over the Identifier and Components sections 10, 12. Such signature is made using a private key belonging to the issuer's trusted agent. The Issuer Certificate section 16 contains a certification by a trusted third party (hereinafter referred to as the "Trusted Agency") used in conjunction with the issuer signature to verify the authenticity of the issued ticket 8. Such certification is in the form of a certificate belonging to the issuer's trusted agent. The general use of certificates and digital signatures is known and described, for example, in D. W. Davies and W. L. Price, Security For Computer Networks (John Wiley & Sons, 1984).

The Transfer History section 18 contains information generated when tickets are transferred between trusted agents after the initial issuing of the ticket 8 by a merchant or authority. A Receiver ID's field 28 contains the receiving trusted agent's identification number. A Sender ID's field 30 contains the sending trusted agent's identification number. A Sender Certs field 32 contains the sending trusted agent's certificate. A Date/Times field 34 contains the date and time of transfer of the ticket 8. As subsequent transfers are made, additional receiver and sender ID's, sender certificates, and dates and times are appended to each field, thus creating a list of transfer history information. It may be noted that the trusted agent ID found in the Receiver field of the Identifier section, should be the same as the first ID in the Sender ID's field.

In addition, whenever a ticket 8 is transferred between trusted agents, the sender digitally signs the ticket over the five preceding ticket sections using a private key belonging to the sender's trusted agent. The Sender Signatures section 20 is then updated by appending the newly created digital signature, thus forming a list of sender signatures.

Transaction Devices

Figure 3:
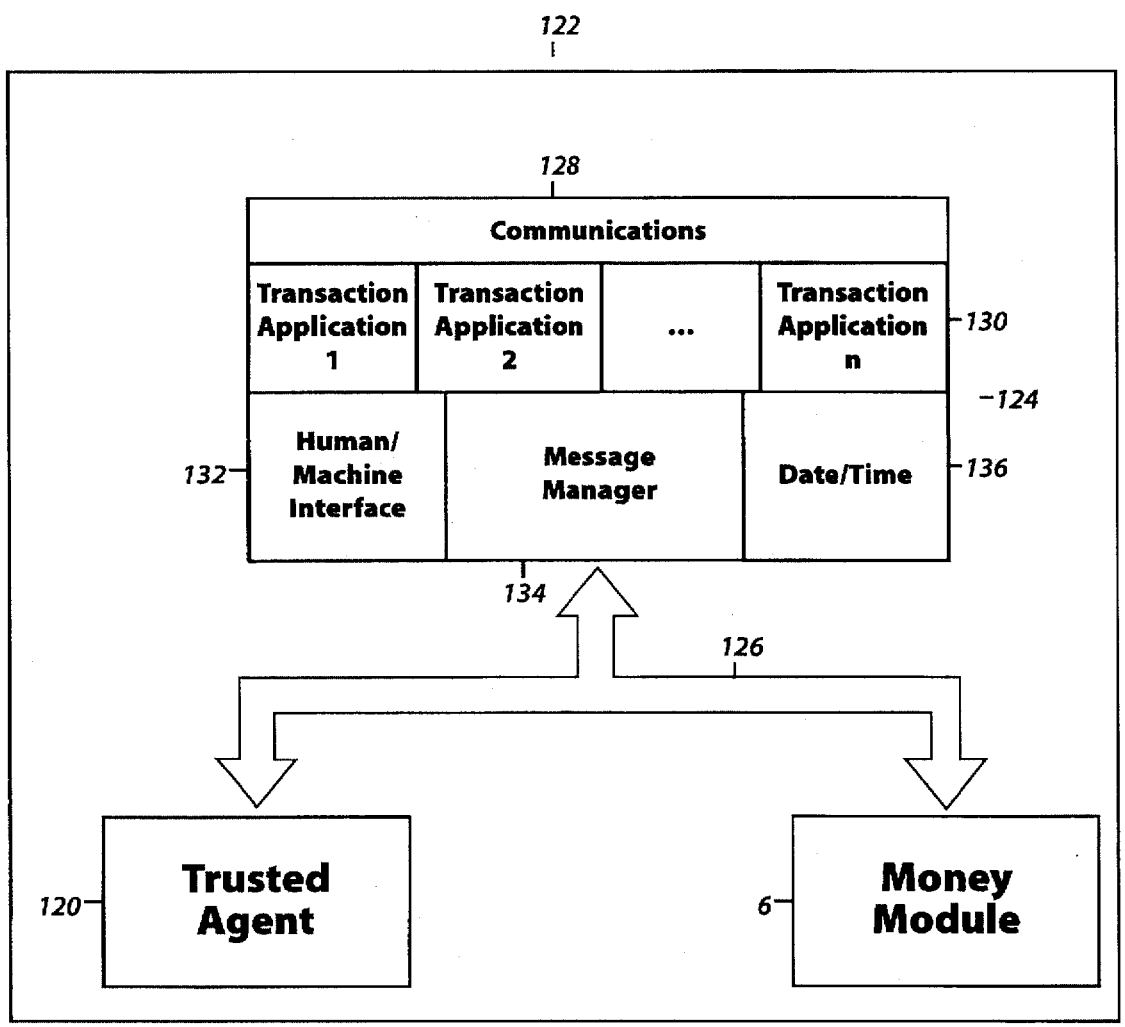
FIG. 3 illustrates the components of a transaction device.

Referring to FIG. 3, a trusted agent 120 is embedded in a transaction device 122. The transaction device 122 is composed of three major components for both the merchant and the customer. There is a host processor 124, a trusted agent 120, and a money module 6. These components are connected, for example, by a bus 126. When trusted agent 120 is a MTA 2, the device 122 is referred to as a merchant transaction device (MTD). When trusted agent 120 is a CTA 4, the device 122 is referred to as a customer transaction device (CTD).

FIG. 3 shows the functional components of the host processor 124. The host processor provides the following functions: Communications 128, Transaction Applications 130, Human/Machine Interface 132, Date/Time 136, and a Message Manager 134.

The Communications function 128 supports communications between the transaction device 122 and the outside world. Such communications may be wired or wireless, broad or narrow band, so long as communications are compatible between the devices. The Communications function 128 sets up the connection between two transaction devices 122, or connects a transaction device to a network for indirect connection to another transaction device or a trusted server.

Transaction Applications 130 may perform a variety of tasks. For example, a transaction application may shop the merchant networks for the lowest merchant transaction fee and/or the best exchange rate in an electronic money purchase or sale transaction. In general, a transaction device 122 contains all the processes to choose, buy and possibly use electronic objects, electronic money, credentials, and other tickets 8, or the processes to sell the same.

The Human/Machine Interface function 132 provides the look and feel of the transaction device 122. It could include a keyboard, mouse, pen, voice, touch screen, icons, menus, etc. The Human/Machine Interface 132 communicates with other functions in the trusted agent 120 and the money module 6 through the message manager 134. In some applications a Human/Machine Interface 132 may not be necessary, for example, in a fully automated merchant transaction device.

The Date/Time function 136 is set by the owner of the transaction device 122 and includes date, time and time zone. The Date/Time information is fed to the embedded trusted agent 120 whenever the trusted agent is opened for use.

The Message Manager 134 routes inter-host messages (i.e., messages between transaction devices) and messages among the host processor 124, the trusted agent 120 and the money module 6.

Trusted Agents

Figure 4A:
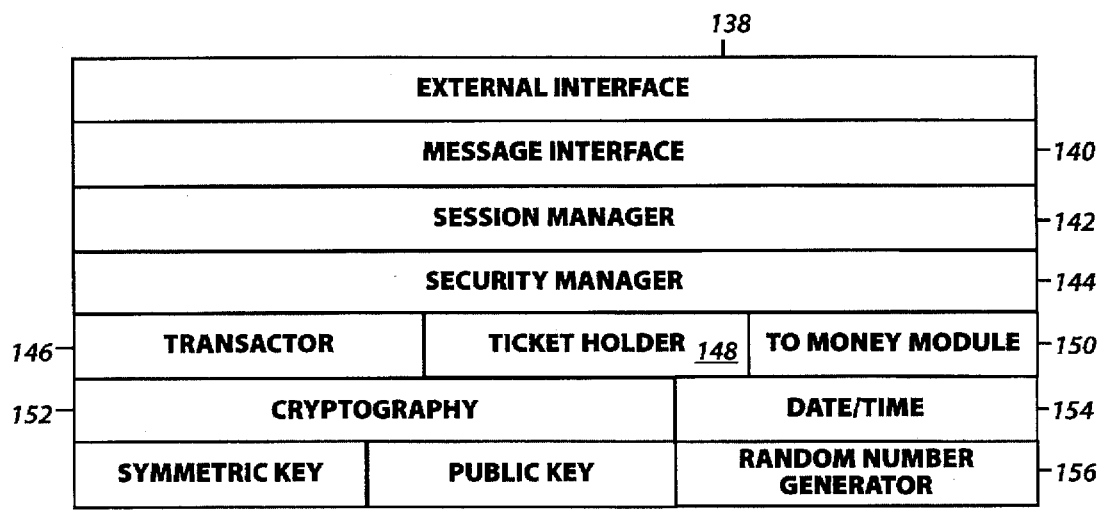
FIGS. 4A–4D illustrate the functional components of trusted agents.
Figure 4B:
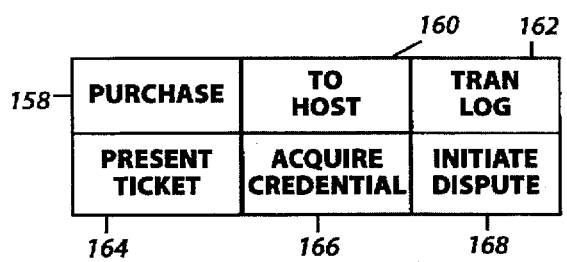
Figure 4C:
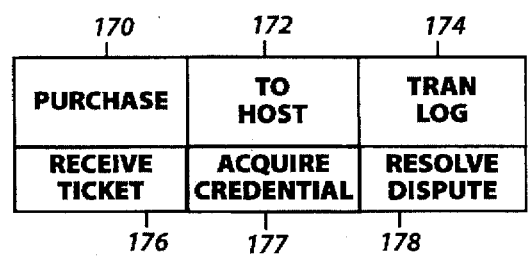
Figure 4D:
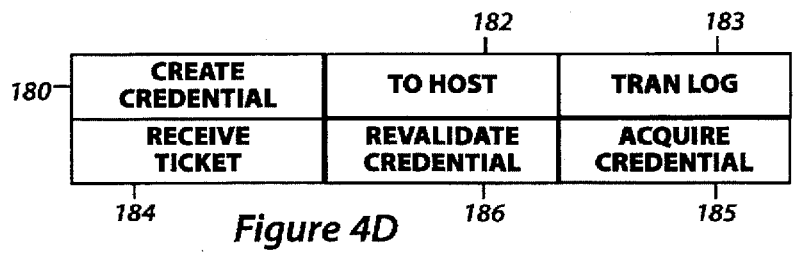

FIG. 4A shows the functional components of a trusted agent 120. The contemplated system for open electronic commerce uses three types of trusted agent 120 which differ in certain unique Transactor functions 146 that they provide. FIG. 4B shows the transactor functions found in a CTA 2. FIG. 4C shows the transactor functions found in a MTA 4. FIG. 4D shows the transactor functions found in an Authority Trusted Agent (ATA) which, in turn, is embedded in an Authority Transaction Device (ATD). ATDs are associated with credential issuing authorities such as a bank.

An External Interface function 138 provides physical communication with the host processor 124 and the money module 6 of the transaction device 122 in which the trusted agent 120 is embedded. A Message Interface function 140 processes and routes inter-agent and intra-agent messages. A Session Manager function 142 sets up and breaks down inter-agent sessions and agent to trusted server sessions. A Security Manager function 144 maintains security information (e.g., a trusted agent certificate and an untrusted agent list) and establishes secure communication with a counter-party trusted agent (via the host processor 124) and with the local money module 6 within the same transaction device 122. The Transactor function 146 provides the protocols to perform a transaction. Customer, merchant and authority transactors are used for CTAs, MTAs and ATAs, respectively.

FIG. 4B shows the customer transactor functions. A Purchase function 158 exchanges payment for tickets 8 and electronic objects. A To Host function 160 provides an interface to the transaction device's host processor 124. A Present Ticket function 164 presents tickets 8 to obtain information or services. An Acquire Credential function 166 interacts to receive a credential ticket. A Tran Log function 162 maintains a log of trusted agent transactions. Both CTAs 2 and MTAs 4 maintain a transaction log which stores the following information: transaction type (e.g., ticket type); a pre-transaction ticket image; a post-transaction ticket image; dispute information including the date of dispute (as maintained by each trusted agent in the dispute dialog), status, and merchant resolution (e.g., replace, refund, denied); and recertifying information (e.g., date of recertification). An Initiate Dispute function 168 presents electronic merchandise if a customer is dissatisfied.

FIG. 4C shows the merchant transactor functions. A Purchase function 170 exchanges tickets 8 and electronic objects for payment. A To Host function 172 provides an interface to the transaction device's host processor 124. A Receive Ticket function 176 processes a received ticket 8 to provide service or information. An Acquire Credential function 177 obtains a merchant credential. A Tran Log function 174 maintains a log of trusted agent transactions. A Resolve Dispute function 178 receives tickets 8 and electronic objects to resolve a customer complaint.

FIG. 4D shows the authority transactor functions. A Create Credential function 180 constructs and delivers credential tickets to a requester. A To Host function 182 provides an interface to the transaction device's host processor 124. A Receive Ticket function 184 processes a received ticket 8 to provide service or information. A Revalidate Credential function 186 accepts a current credential and reissues the credential with a new expiration date. A Tran Log function 183 maintains a log of transactions. An Acquire Credential function 185 obtains an authority credential.

Referring again to FIG. 4A, a To Money Module function 150 communicates with the money module 6 in the same transaction device 122 to provide payment. A Cryptography function 152 provides public key and symmetric key cryptographic functions. Any well known public and symmetric key cryptography techniques may be used, for example, RSA and DES. A Ticket Holder function 148 creates tickets 8 in a MTA 4 or stores and retrieves tickets 8 in a CTA 2. A Random Number Generator function 156 generates random numbers to produce cryptographic keys. A Date/Time function 154 manages the date and time delivered from the host processor 124 to date tickets 8 and validate certificates and presented tickets. Current clock information is fed to the trusted agent 120 every time the trusted agent is opened (i.e., signed on for use) and maintained until the trusted agent is closed.

The trusted agent/money module hardware may consist of the following: a microcontroller (e.g., Intel 196 family) for executing the transaction protocols; a high-speed volatile memory (e.g., SRAM) for storing the operating system, parts of the applications, cryptography, etc. during execution; a non-volatile memory (e.g., flash memory) for storing the operating system, applications, tickets, electronic money, logs, etc.; an integrated circuit clock for providing a time reference; a battery for the clock; and a noisy diode or other random source for a random number generator.

System Overview

Figure 5:
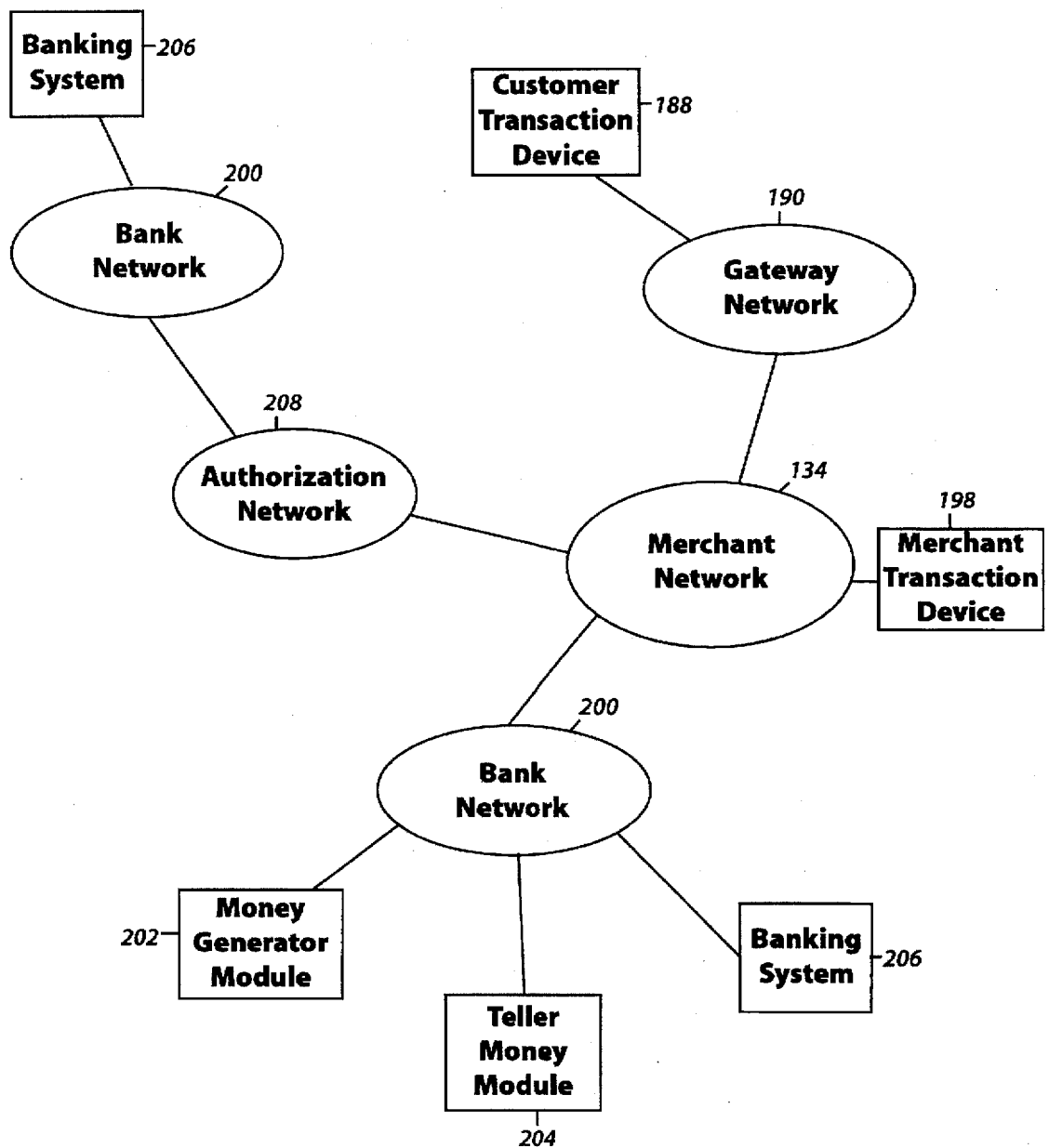
FIG. 5 is a diagram showing the network structure for open distribution of electronic money.

FIG. 5 shows the general network architecture of the contemplated system for open distribution of electronic money. Customer transaction device 188 can communicate with a merchant through any gateway network 190. The customer can search out merchants' electronic space for the purchase or sale of electronic money, and select the merchant offering the lowest transaction fee and/or exchange rate. The system then provides for secure authorization-based purchase/sale of electronic money via credit or debit card. This is accomplished by the customer presenting credit or debit card information stored within the trusted agent 120 as a credential.

In the preferred embodiment, the gateways 190 provide CTDs 188 with access to local merchant networks 134 that are connected to MTDs 198. The merchant network 134 is connected to the merchant's bank network 200 that, as described in my copending application Ser. No. 07/794,112, has access to electronic money via money generator module 202, teller money module 204, and banking system 206 which provides the bank's on-line accounting system.

The credit or debit card credentials are processed to obtain authorizations for the crediting or debiting of the customer's bank account via authorization network 208. Card authorization is well known in the art and typically involves the card issuer or its agent authorizing a particular payment when sufficient funds are present or the amount is within the card holder's credit limit. Authorization networks also credit a customer's account, for example, when making a refund. Authorization network 208 is connected to the customer's bank network 200 which, in turn, is connected to banking system 206, which contains the customer's bank account.

This architecture allows subscribers who are not customers of electronic monetary system member banks to nevertheless gain access to electronic money via merchants who do have access to member banks. This system structure allows the subscriber to buy or sell electronic money from many distribution points, which from the subscriber's point-of-view is effectively the same as withdrawing or depositing electronic money from/to their bank account.

It should also be noted that an electronic monetary system bank could also provide the above-described distribution service via an MTD 198. In this case, of course, there would be no need for a merchant network 134. The bank network 200 would simply connect to a money generator module 202, teller money module 204, banking system 206, MTD 198, authorization network 208, and gateway network 190. Otherwise, the transaction would be the same.

Flow Charts

The flow charts shown in the following figures use the designations "A" and "B" to indicate two interacting trusted agents 120. The same designations A and B, may also be applied to the host processor 124 or money module 6 associated with a particular trusted agent 120 (i.e., within the same transaction device 122). The flow charts indicate the functional component primarily responsible for carrying out a given task. For example, SECURITY MANAGER A means that the recited task is carried out by the Security Manager function 144 (see FIG. 4A) in trusted agent A.

The flow charts also call subroutines some of which use parameter designations X and Y. For example, ESTABLISH SESSION A→B is a call to the subroutine Establish Session. The Establish Session flow chart should then be followed with the understanding that X=A and Y=B throughout the flow.

Abort And Commit

In transaction processing of the type contemplated it is desirable to pass electronic items such as tickets 8 and electronic notes between two parties, while maintaining a zero-sum game. In other words, it is undesirable to duplicate electronic items so that at the completion of an electronic transaction there are twice as many items as before the transaction. Similarly, it is undesirable to lose electronic items so that there are fewer items after the transaction than before. For example, if at the start of a transaction A has an electronic ticket 8 and wishes to pass it to B, then it is desirable to ensure that at the end of the transaction, B has the electronic ticket 8 and A does not have the electronic ticket 8. In the real world, however, it is possible to have two other outcomes, namely, both A and B have the same electronic ticket 8 (duplication) or neither A nor B have the electronic ticket 8 (loss).

In order to render the likelihood of duplication or loss negligible, the transaction protocol must take into account the possibility that natural or intentional events may interrupt a typical transaction flow. A natural interruption is exemplified by a breakdown of the communications link between A and B during the transaction. To minimize the possibility of duplication or loss from such a random event the window of opportunity for creating a duplication or loss must be minimized. In order to minimize intentional interruptions (i.e., overt attacks), it is desirable to eliminate the economic incentive for such an attack. For example, if an attacker could only lose the tickets and or the money by trying to interrupt a transaction, the attacker would have no incentive to initiate the attack in the first place.

These concepts are embodied in the efficient transaction protocols of the described system. In particular, it is desirable to ensure consistent abort and commit states between the two transacting trusted agents 120 (or money modules 6). For example, if A commits to a transaction, then B should also commit to the transaction; or, if A aborts the transaction, then B should also abort the transaction. To achieve consistency and minimize the possibility of duplication or loss (in the event there is an inconsistency) the transaction protocols take into account the order and timing of A's and B's committing to a given transaction.

FIG. 6 shows two subroutines, Abort and Commit. The abort subroutine is internally executed within a given trusted agent 120 when the transaction it is involved in fails. The abort subroutine rolls back or returns the trusted agent 120 to the exact state it was in prior to being involved with the failed transaction. In addition, if the merchant trusted agent aborts after an authorization, then the authorization will be reversed. Conversely, the commit transaction is internally executed within a given trusted agent 120 when the transaction it is involved in has been successfully completed. The trusted agent 120 therefore records the completed transaction in its transaction log and is now ready for a new transaction. For example, during a ticket transfer transaction an electronic ticket 8 is passed from trusted agent A to trusted agent B. Since at this point in time neither A nor B have committed or aborted the transaction, A provisionally retains the ticket 8 while B provisionally also has the ticket 8. If both A and B commit then A will delete its ticket 8, and B's retention of the ticket 8 will no longer be provisional. If, however, both A and B abort then A will retain its ticket 8 and the ticket 8 that B was retaining provisionally will be deleted by rolling back the transaction. Note that the deletion operation may be implemented in various ways well known in the art. As mentioned before, it is desirable to minimize the possibility of one trusted agent 120 committing while another trusted agent 120 aborts because this may in some limited circumstances result in duplicating or losing electronic items.

A similar situation exists with respect to money modules 6 exchanging electronic notes. During a purchase transaction, electronic notes are passed from money module A to money module B, so that A provisionally decrements its electronic notes (by the amounts transferred) while B provisionally has electronic notes (in the transferred amount). If both A and B commit then A will retain the notes in the decremented amounts and B's retention of the electronic notes will no longer be provisional.

Figure 6A:
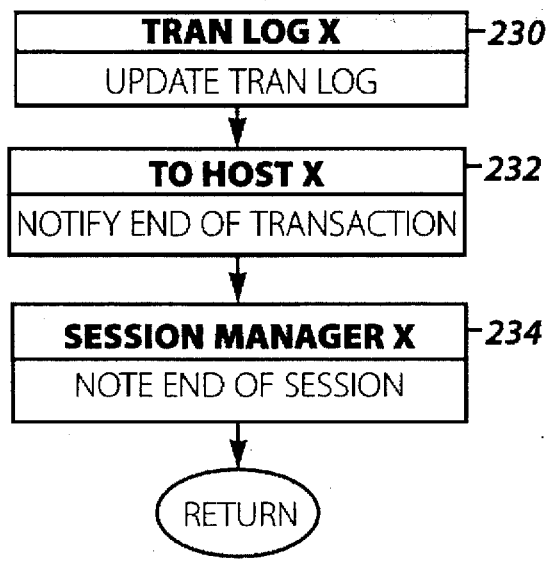
FIG. 6A illustrates a Commit protocol.

FIG. 6A shows the commit subroutine. Tran Log X updates the transaction log. To Host X notifies the host that the transaction is complete. Session Manager X notes the end of the session. (Steps 230–234).

Figure 6B:
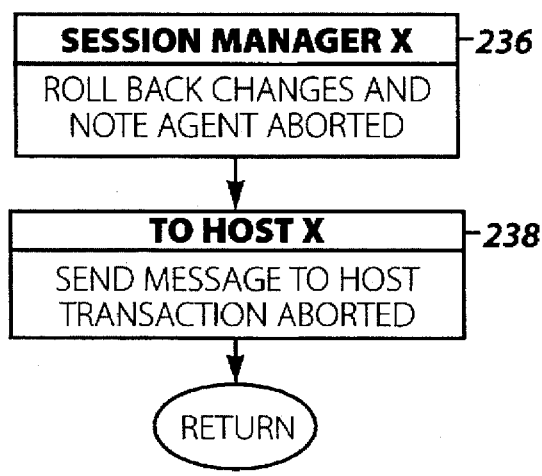
FIG. 6B illustrates an Abort protocol.
Figure 7A:
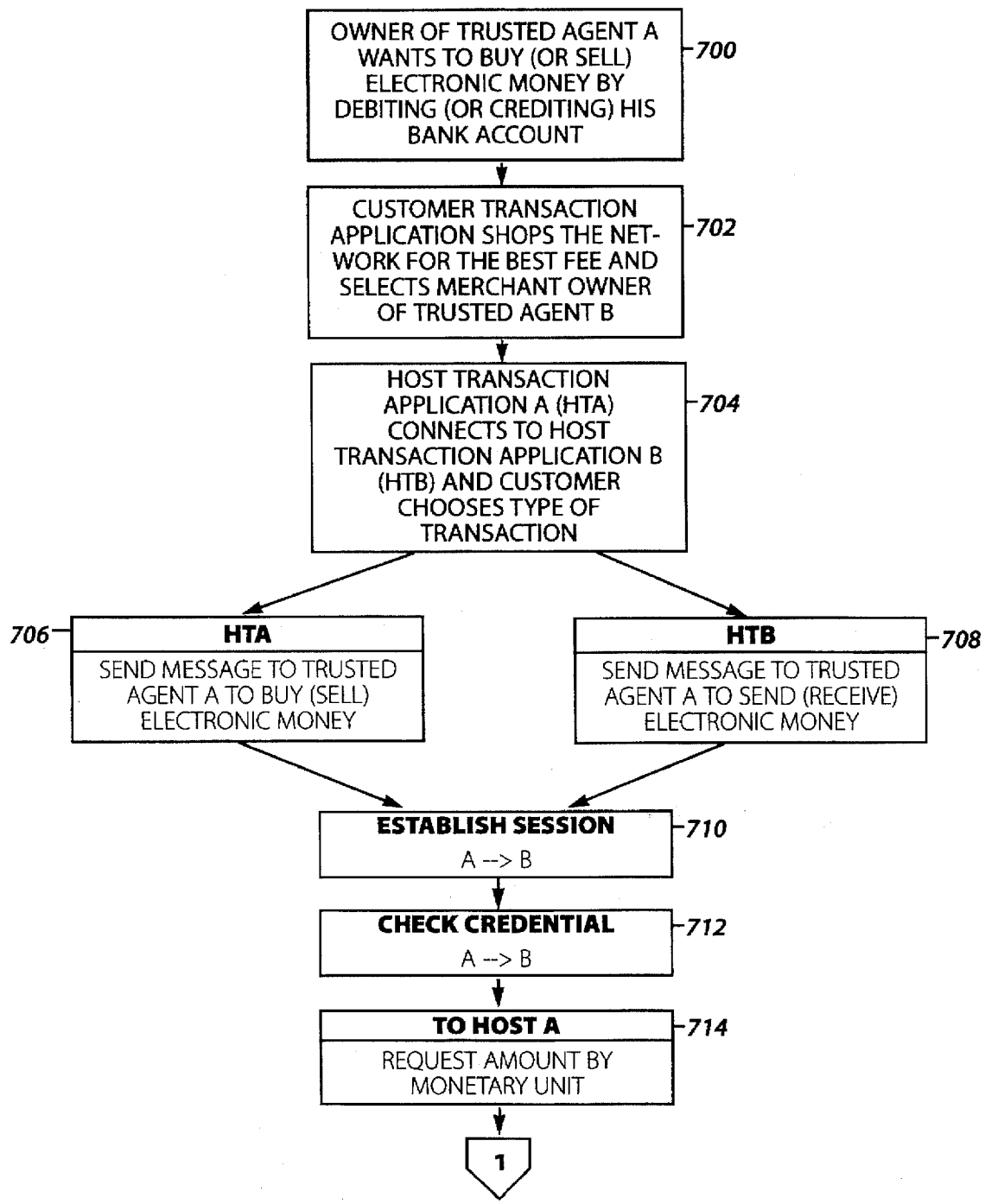
FIGS. 7A–7G illustrate an Authorization-Based Purchase/Sale of Electronic Money protocol.
Figure 7B:
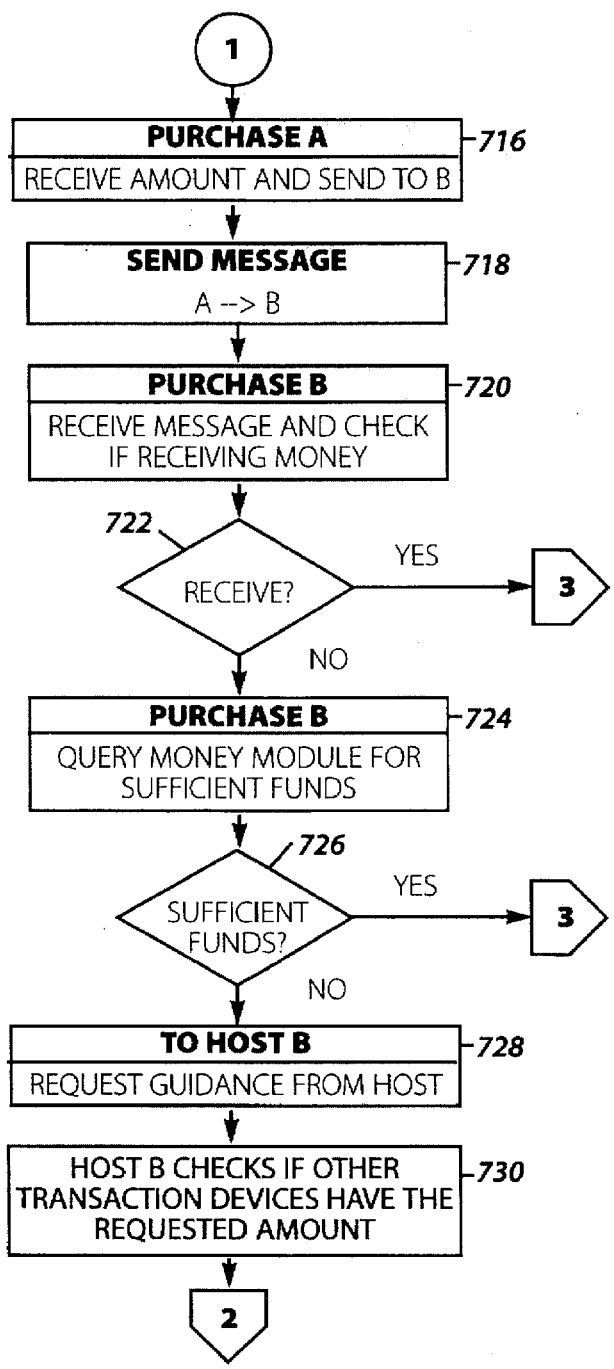
Figure 7C:
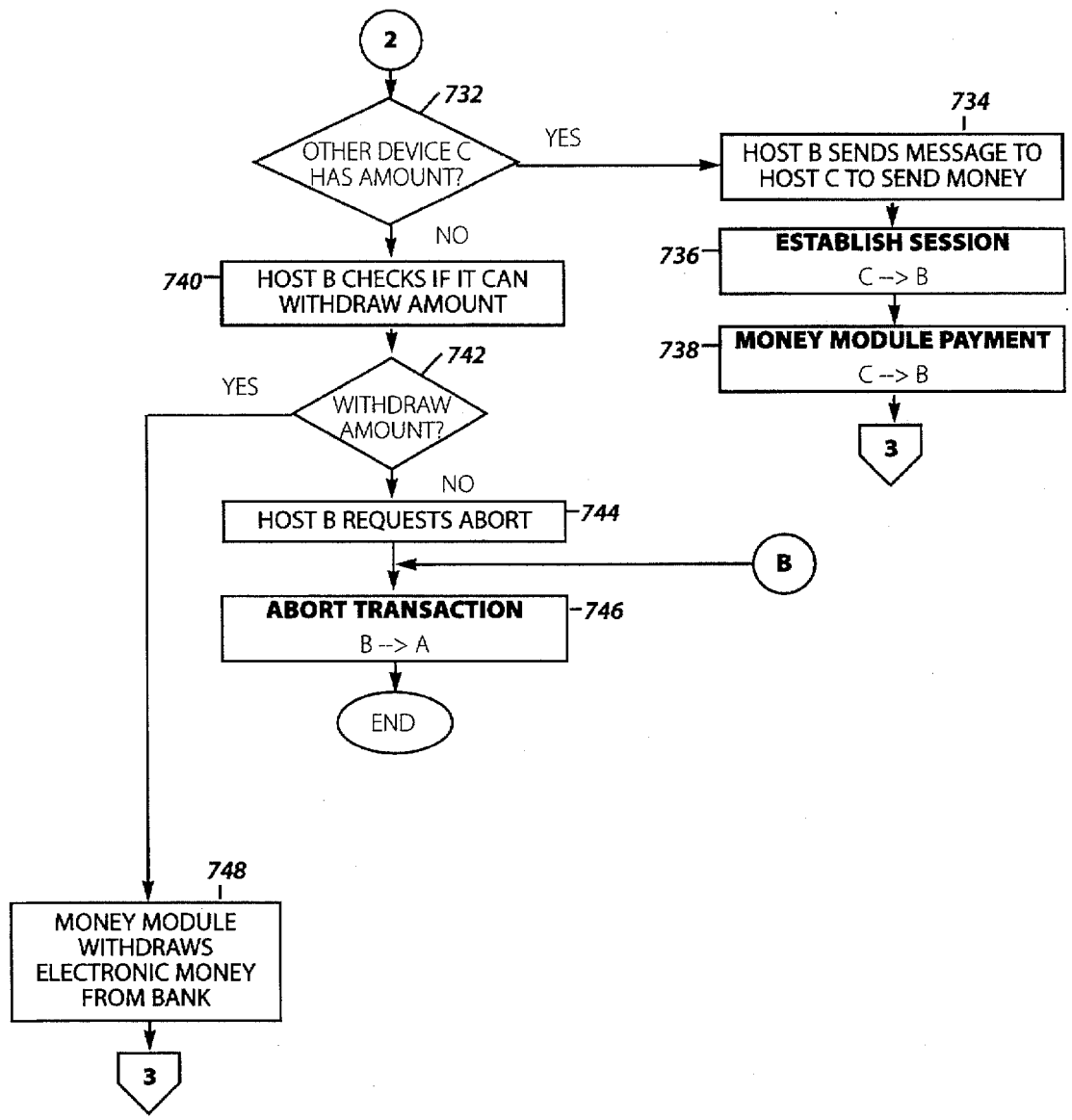
Figure 7D:
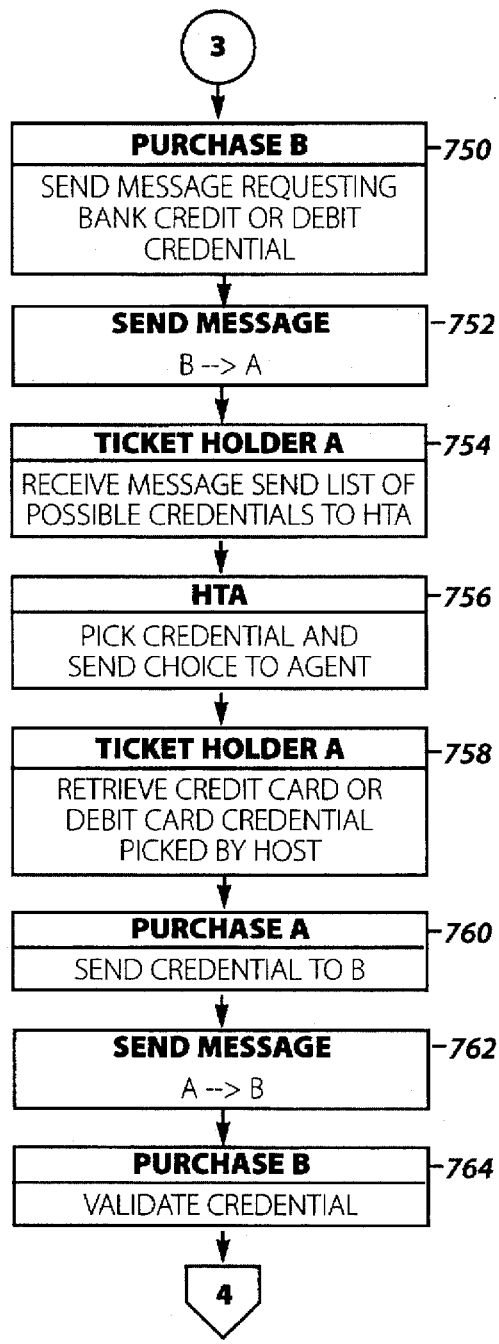
Figure 7E:
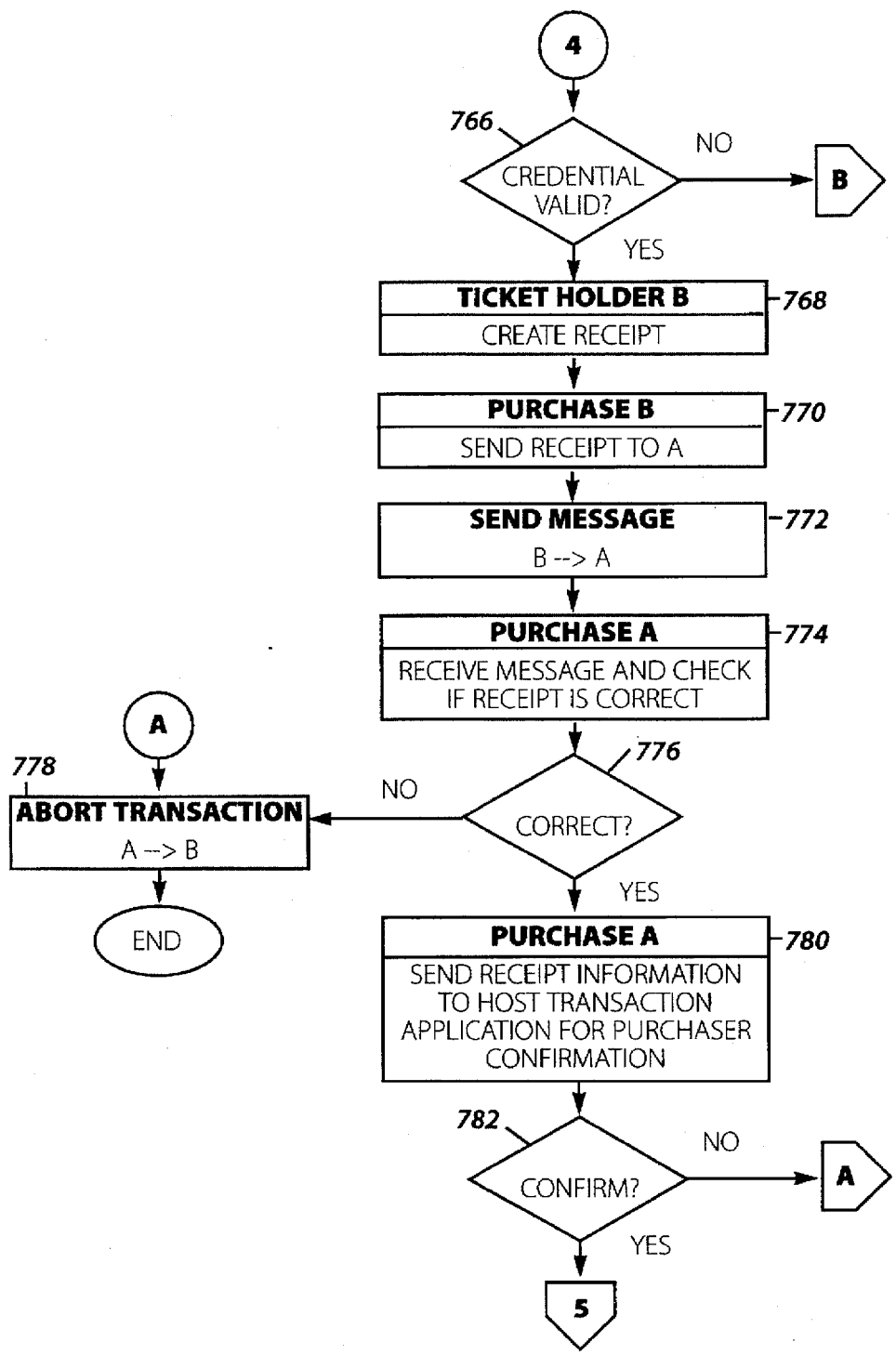
Figure 7F:
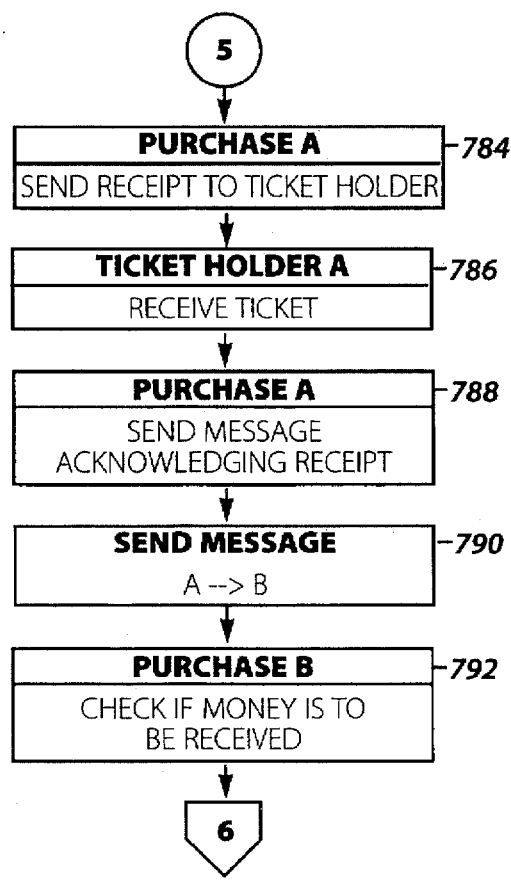
Figure 7G:
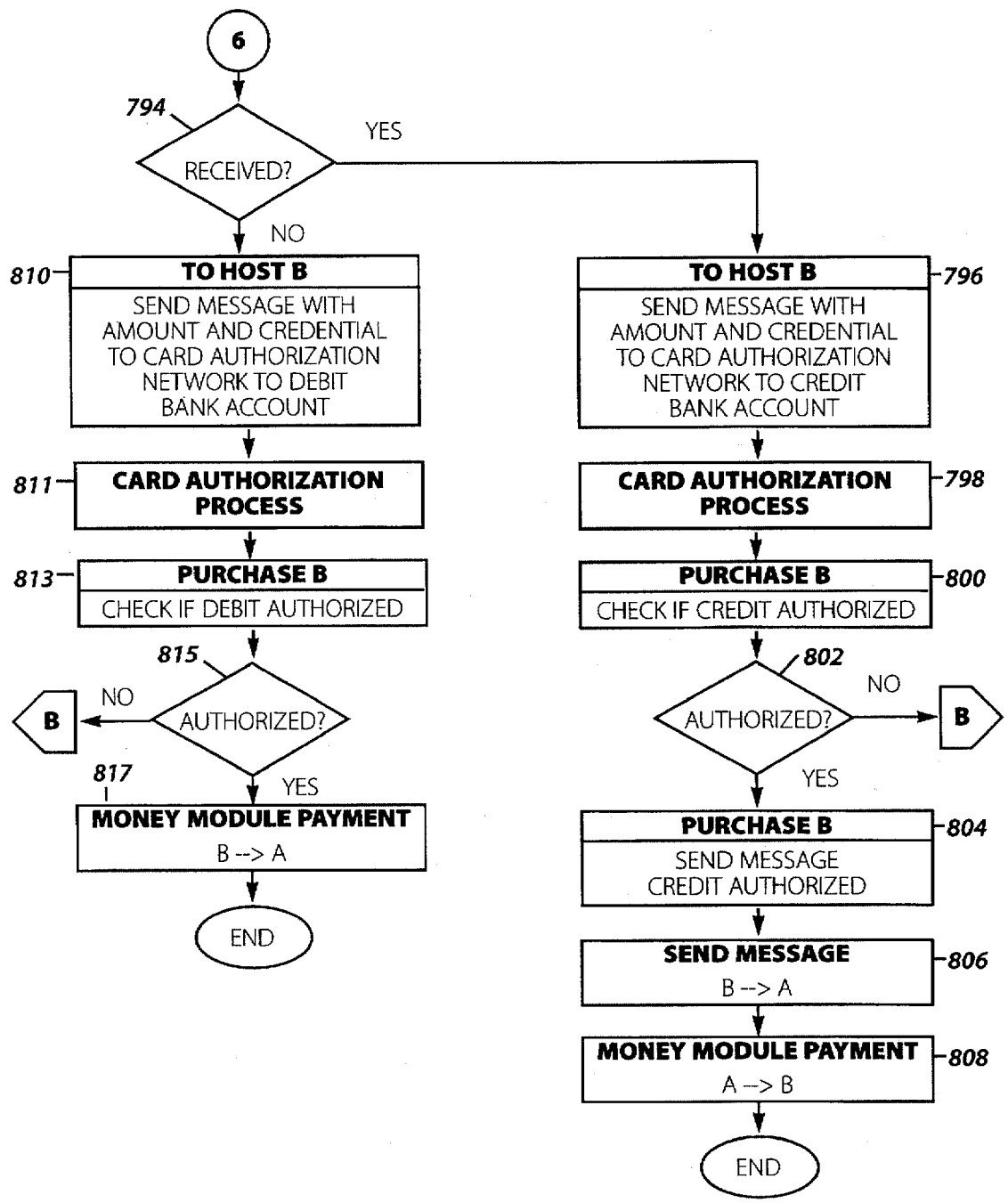
Figure 8A:
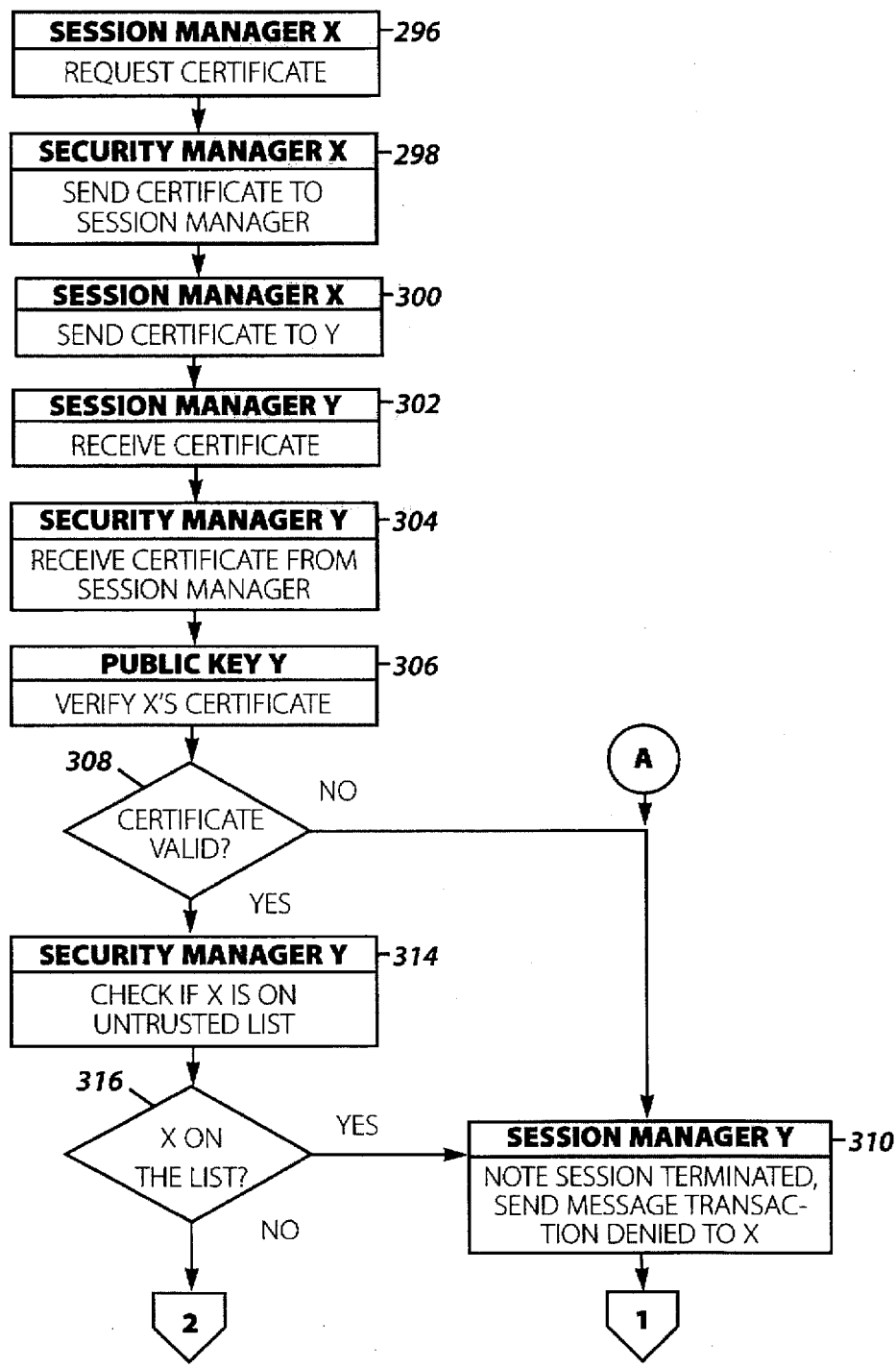
FIGS. 8A–8E illustrate an Establish Session protocol.
Figure 8B:
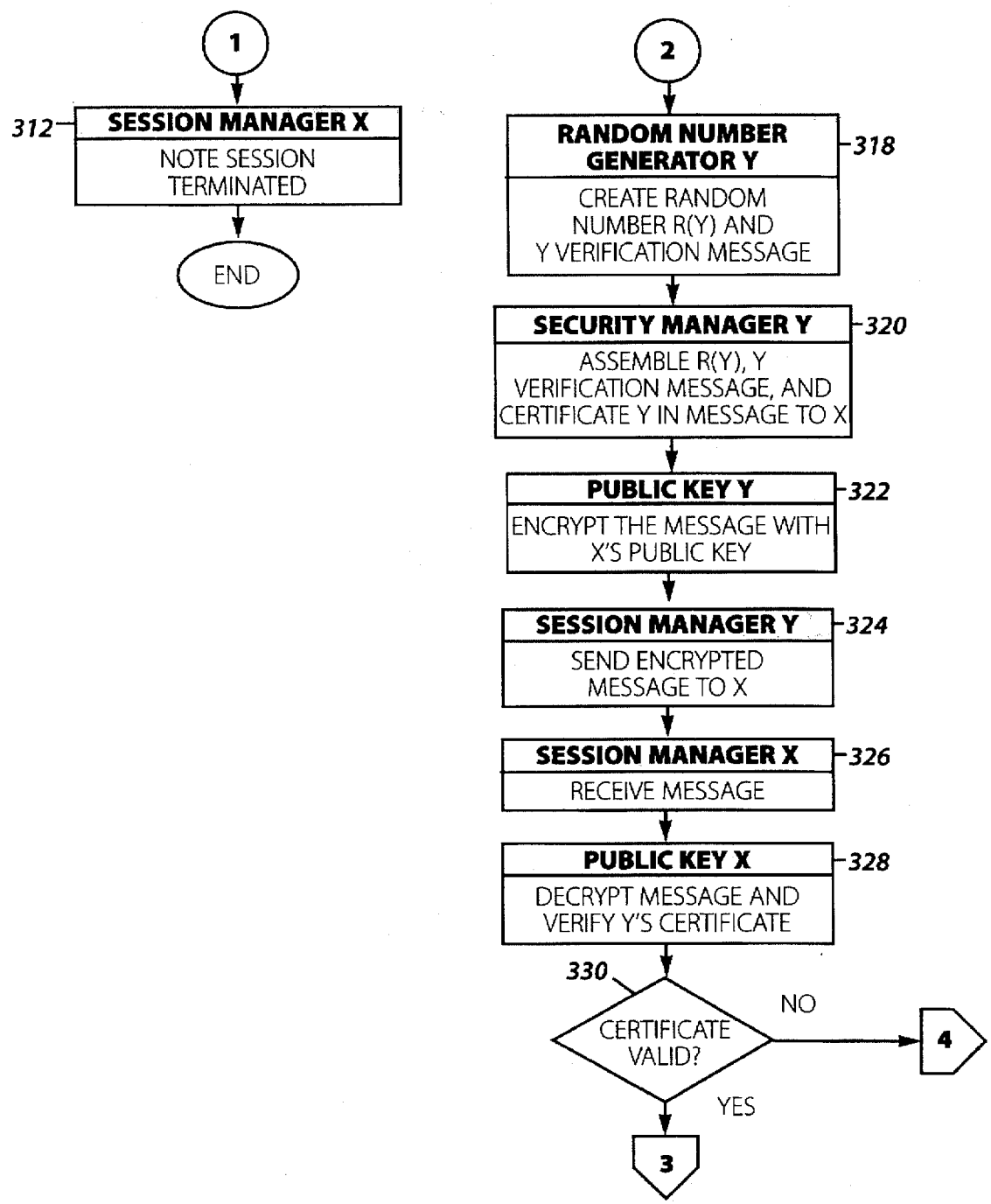
Figure 8C:
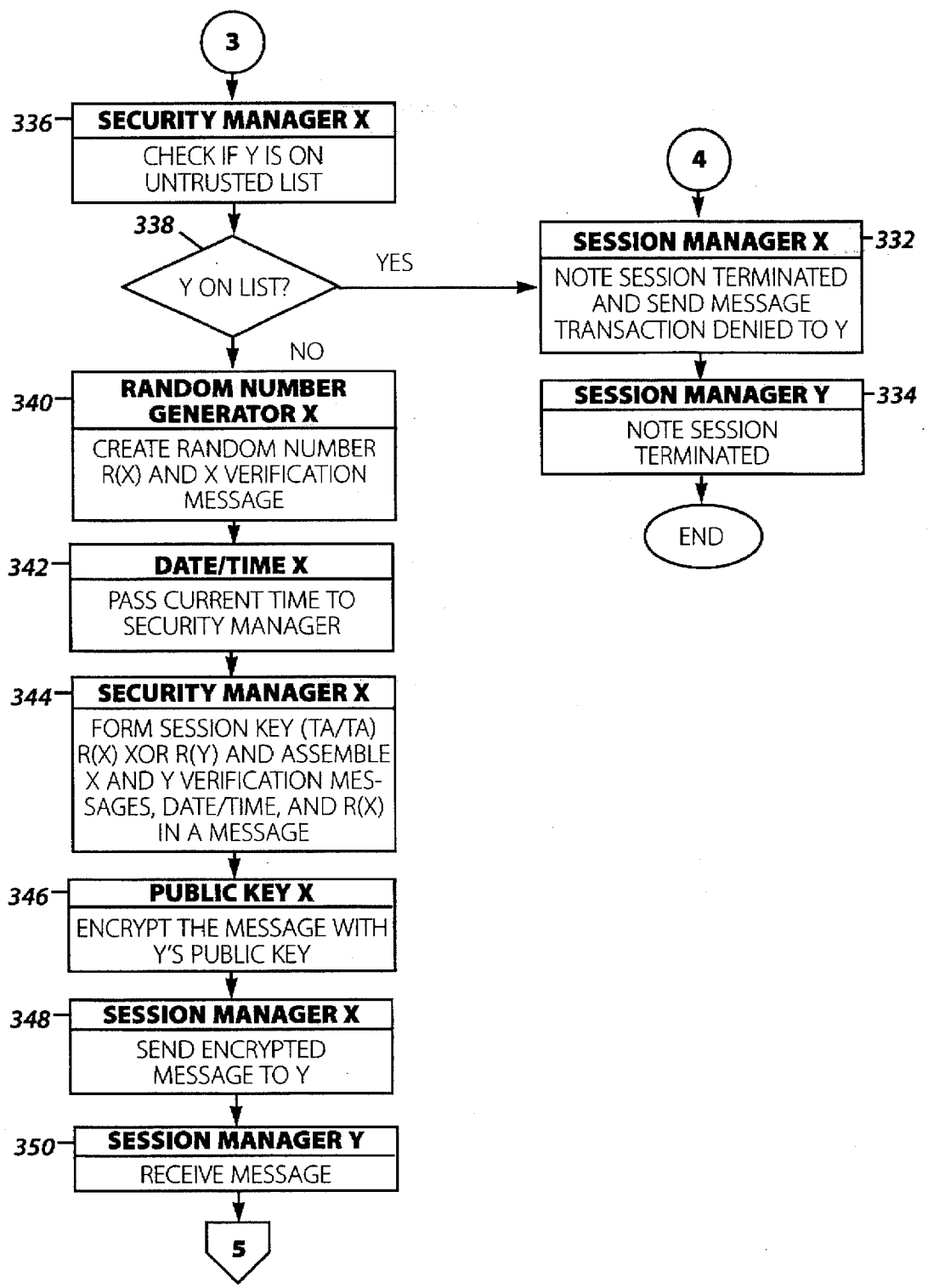
Figure 8D:
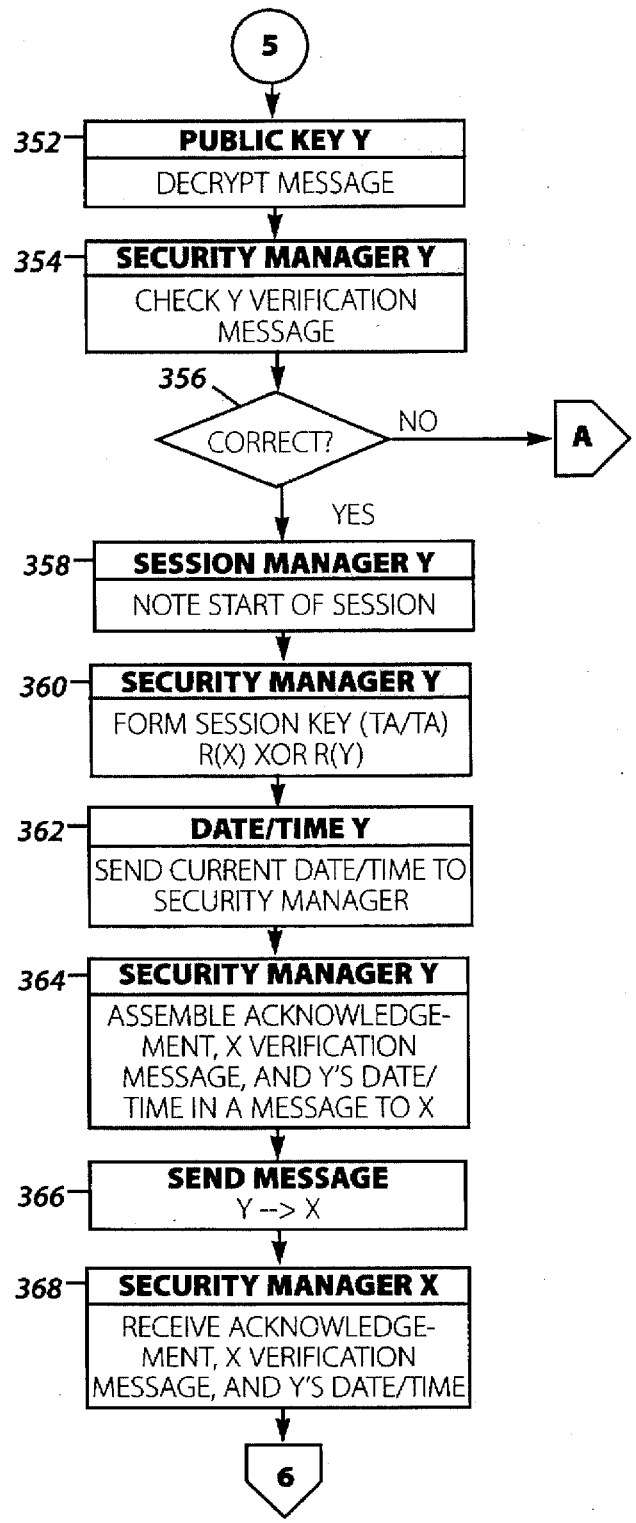
Figure 8E:
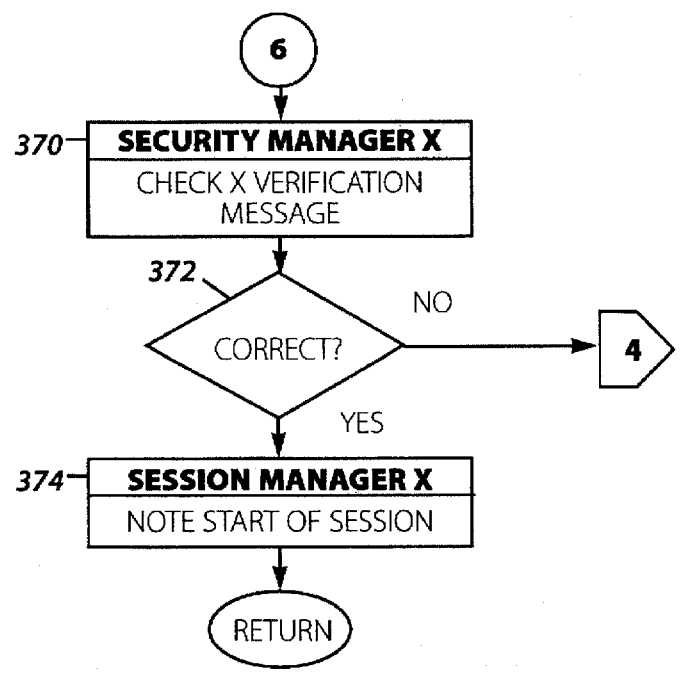

FIG. 6B shows the abort subroutine. Session Manager X rolls back changes and notes agent aborted. The Session Manager keeps track of what has been done since the start of a session and when rolling back undoes these steps. To Host X sends a message to the host that the transaction is aborted. (Steps 236–238).

The abort subroutine may be called directly from a flow diagram, for example, when a trusted agent 120 determines that a certificate is not valid. The abort subroutine may also be called when an expected action does not occur. In particular, when two trusted agents 120 are communicating, they will be monitoring a time-out protocol. For example, after a first trusted agent 120 has sent a message to a second trusted agent 120, the Session Manager of the first trusted agent (A) will set a timer for a reply if a reply is required. The Session Manager may also number the message sent. This number would appear in the reply message from the Session Manager of the second trusted agent (B).

If the timer expires before the message has been received, then Session Manager A will query Session Manager B to determine if the transaction is still running in B. If B does not reply then Session Manager A will abort the transaction. If a reply is received that the transaction is proceeding, then the timer will be reset to a new time. If A queries B a predetermined number of times without receiving a reply to the original message, then A will abort the transaction. A similar time-out function exists in the money modules 6.

Purchase/Sale of Electronic Money

FIG. 7 shows the flow chart for an authorization-based purchase/sale of electronic money. When the owner of a trusted agent A wants to buy or sell electronic money by debiting or crediting his bank account, he uses a transaction application in his CTD 188 to shop the merchant networks 134 for the lowest merchant transaction fee and/or exchange rate and selects, in this example, the merchant owner of trusted agent B (steps 700–702). It may be noted that, alternatively, the authorization network could set the exchange rate.

Host transaction application A (HTA) then connects to host transaction application B (HTB), whereupon the customer chooses the type of transaction, namely a purchase or sale of electronic money (step 704). HTA sends a message to its trusted agent A to buy (sell) electronic money, and HTB sends a message to its trusted agent B to send (receive) electronic money (steps 706–708).

The customer's and merchant's trusted agents (A and B) then establish a session as described in co-pending U.S. application Ser. No. 08/234,461. In particular, an Establish Session subroutine is called (step 710) for setting up a cryptographically secure communication channel between trusted agent A and trusted agent B. Referring to FIG. 8, the Session Manager of trusted agent A requests and then receives A's certificate (i.e., cert (TA)) from the Security Manager (steps 296–298). Session Manager A then sends cert(TA) to trusted agent B's Session Manager which, in turn, passes it along to its Security Manager (steps 300–304).

Trusted agent B's Public Key function verifies the cert (TA) by using the validation protocols such as those discussed in co-pending U.S. applications Ser. Nos. 08/234,461 and 08/427,287 (steps 306–308).

If cert(TA) is not valid, then Session Manager B notes that the session is terminated and informs Session Manager A that the transaction is denied. Session Manager A also notes that the session is terminated. (Steps 310–312). If cert(TA) is valid, then Security Manager B checks if trusted agent A is on the untrusted list (steps 314–316). If trusted agent A is untrusted, then the session is terminated (steps 310–312).

If A is not on the untrusted list, then Random Number Generator B creates a random number R(B) and also a B verification message (step 318). The random number R(B) will eventually be used to form a session key. The B verification message is a random number used by B to protect against message replay. Next, Security Manager B assembles R(B), the B verification message, and cert(TA) into a message for trusted agent A (step 320). Public Key B encrypts the message using trusted agent A's public key (TA(PK)) which trusted agent B received with A's cert(TA) (step 322). Session Manager B sends the encrypted message to A's Session Manager (steps 324–326).

Public Key A decrypts the message using its private key (corresponding to its public key) and verifies the validity of cert(TA) (steps 328–330). If cert(TA) is invalid, then Session Manager A notes the session as terminated and sends a transaction denial message to B whose Session Manager also notes the session as terminated (steps 332–334). If cert(TA) is valid, then Security Manager A checks if trusted agent B is on the untrusted list (steps 336–338). If trusted agent B is on the list, the session is terminated (steps 332–334).

If B is not on the untrusted list, then Random Number Generator A creates a random number R(A) and an A verification message (e.g., another random number) (step 340). The Date/Time function passes the current date and time to the Security Manager (step 342). Dates and times are exchanged by A and B for eventual recording in their trans logs during commits. Security Manager A then forms and stores session key (TA/TA) by exclusive ORing random numbers R(A) and R(B) (step 344). Session key (TA/TA) is used to encrypt communications between two trusted agents 120. Session Manager A assembles a message containing the A and B verification messages, the date/time information, and R(A) (step 344). Public Key A encrypts the message with trusted server B's public key (received by A in cert (TA)) and sends the encrypted message to trusted server B's Session Manager (steps 346–350).

Public Key B decrypts the received message using its secret key (corresponding to its public key) (step 352). Security Manager B checks if the B verification message received from A is the same B verification message it previously sent to A (steps 354–356). If it is not the same, then the session is terminated (steps 310–312). If it is the same, then Session Manager B notes the start of the session (step 358).

Security Manager B forms session key (TA/TA) by R(A) XOR R(B) and then stores the session key (step 360). At this point, both A and B have created and stored the same session key (i.e., session key (TA/TA)) to be used for their current interaction. Next, Date/Time B sends its current date and time information to Security Manager B (step 362). Security Manager B assembles a message having an acknowledgement to A, the A verification message, and B's date/time information (step 364). The Send Message subroutine is then called (step 366) for sending the message from B to A.

Figure 9:
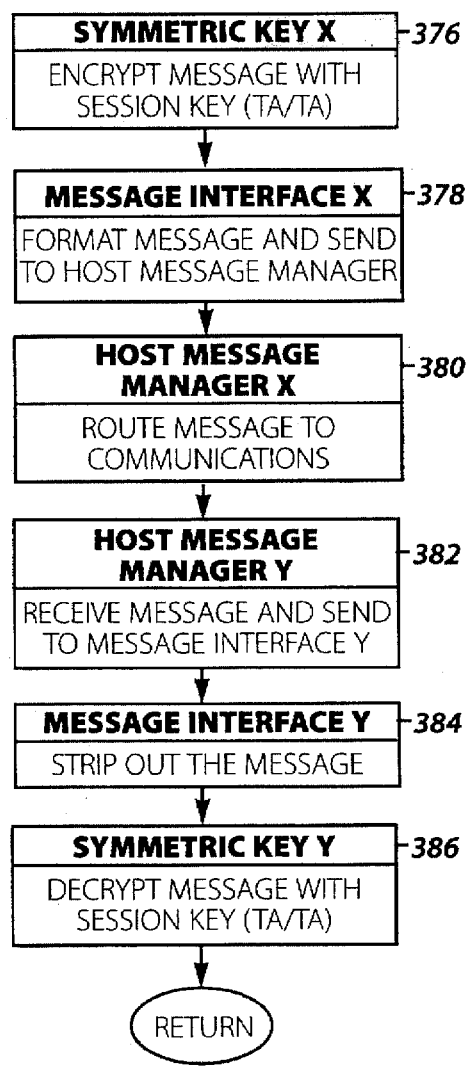
FIG. 9 illustrates a Send Message protocol.

Referring to FIG. 9, trusted agent B's Symmetric Key function encrypts the message using session key (TA/TA) (step 376). Message Interface B then formats the message and sends it to the host processor's Message Manager (step 378). Host Message Manager B then routes the message via Communications to Host Message Manager A in trusted agent A's host processor (step 380). Host Message Manager A then sends the message to trusted agent A's Message Interface which strips out the message (steps 382–384). Symmetric Key A decrypts the message with session key (TA/TA) thus completing the secure communication of a message between trusted agent and trusted agent using session key (TA/TA) (step 386).

Referring again to FIG. 8, Security Manager A receives the acknowledgement, A verification message and B's date/time information (step 368). Security Manager A checks if the A verification message is the same A verification message which A previously sent to B (steps 370–372). If it is not the same, then Session Manager A terminates the session (steps 332–334). If it is the same, then Session Manager A notes the start of the session (step 374).

Figure 10:
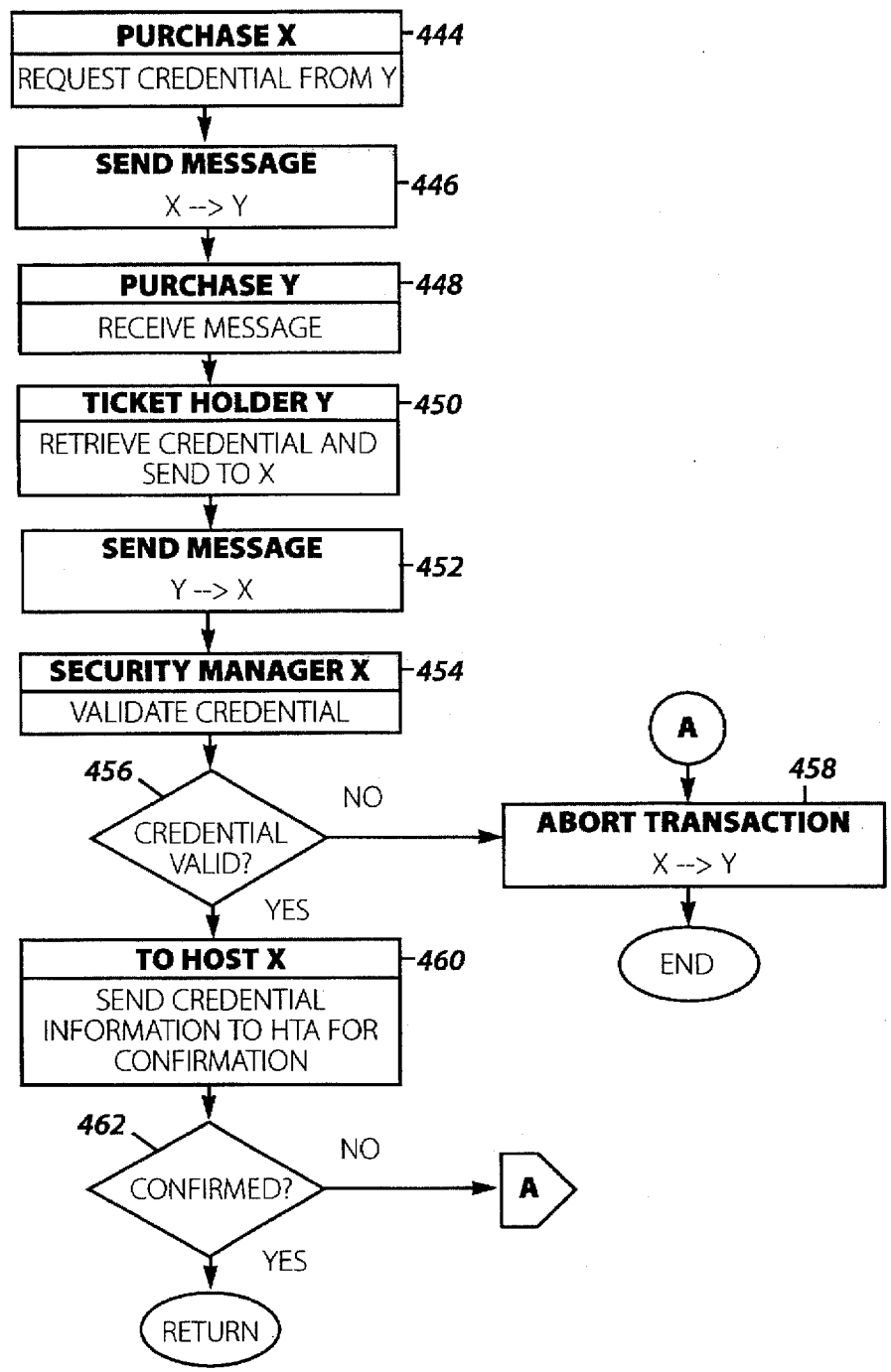
FIG. 10 illustrates a Check Credential protocol.

Referring again to FIG. 7, after establishing a session, trusted agent A requests and checks the merchant credential of trusted agent B, also as described in U.S. application Ser. No. 08/234,461. In particular, referring to FIG. 10, the Check Credential subroutine is called (step 712). All MTDs 198 contain a credential identifying the owner/merchant (e.g., NYNEX, Ticketron, etc.). Such merchant credentials may, for example, be issued by a merchant identification authority controlled by the Trusted Agency. On the other hand, customer credentials held by CTDs 188 may include driver's licenses or credit cards issued by various identification authorities. Referring to FIG. 10, Purchase A sends a message to Purchase B of trusted agent B requesting its merchant credential (steps 444–448). Ticket Holder B retrieves its merchant credential and sends the credential to A for validation (steps 450–456).

Credentials or any other type of ticket 8 are validated as follows:

1) Validate issuer certificate and check issuer signature.
2) Verify each transfer—match receiver and sender identifiers (i.e., $S_o$=Issuer, $R_o$=1st receiver, then $R_i=S_{i+1}$, $i \geq o$).
3) Validate each sender certificate and check each sender signature.
4) Verify that the last receiver identifier matches the identifier (TA(id)) of the certificate (cert(TA)) of the trusted agent in the current session.

Figure 11:
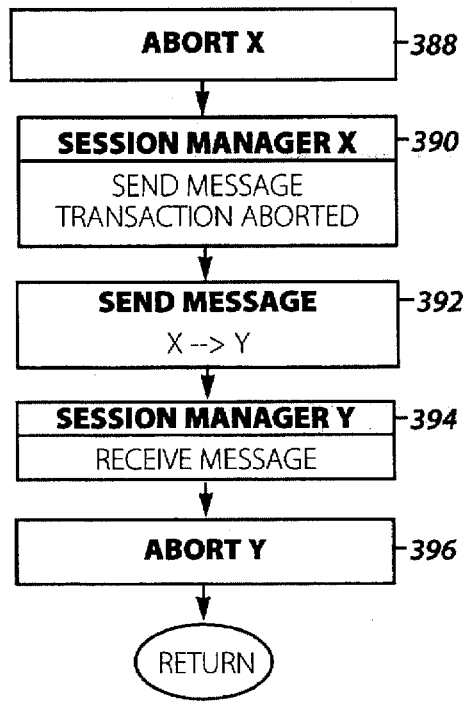
FIG. 11 illustrates an Abort Transaction protocol.
Figure 12A:
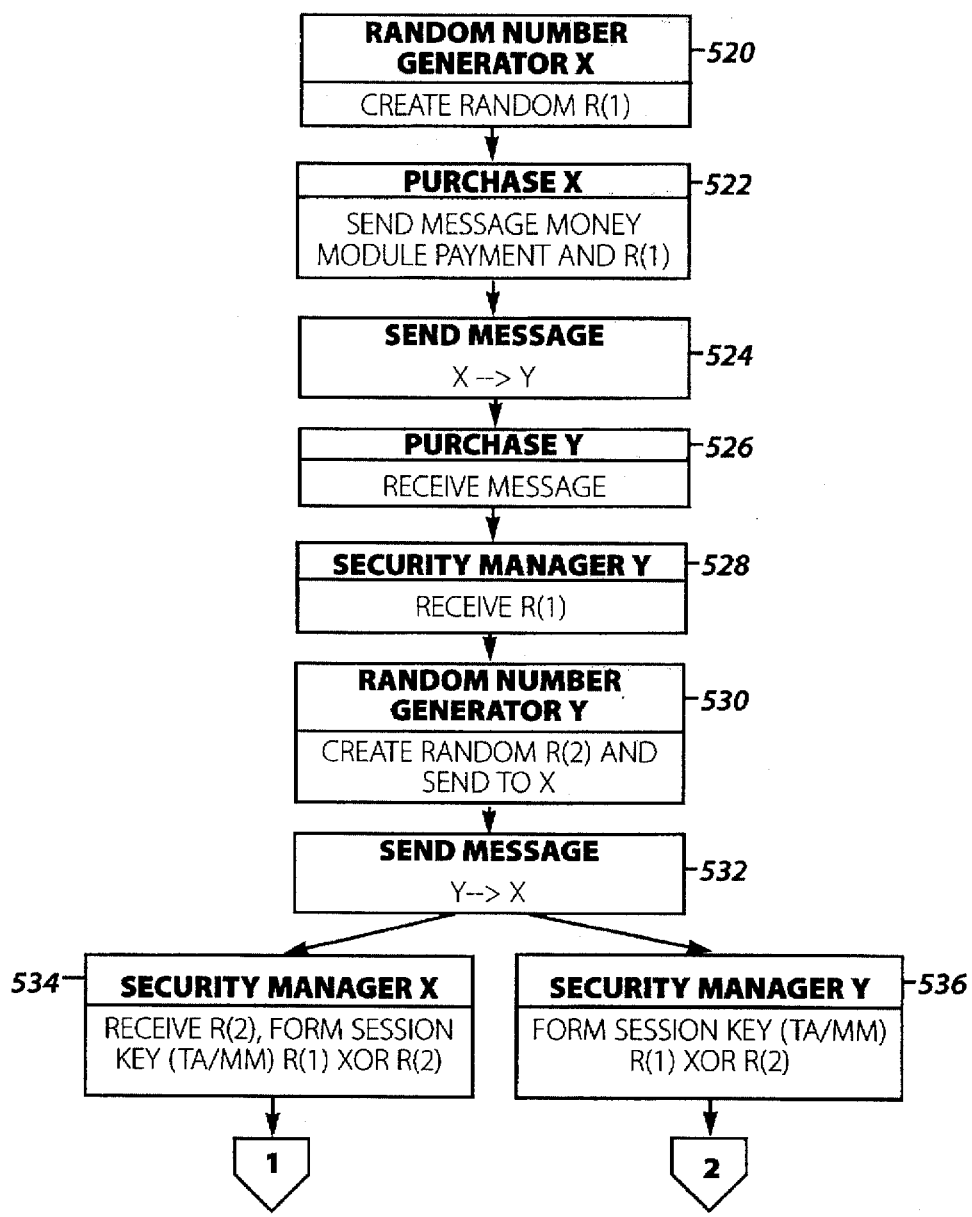
FIGS. 12A–12E illustrate a Money Module Payment protocol.
Figure 12B:
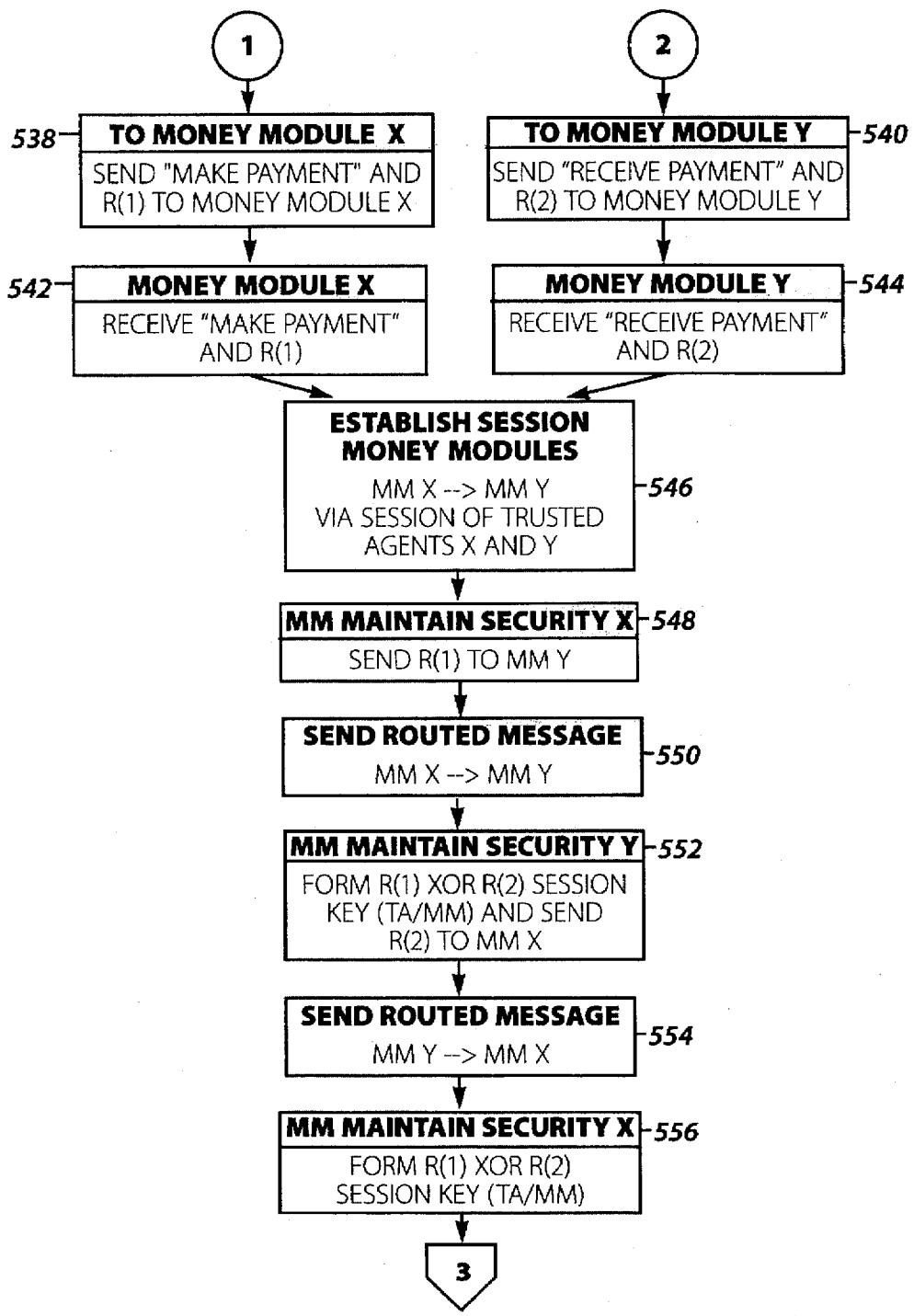
Figure 12C:
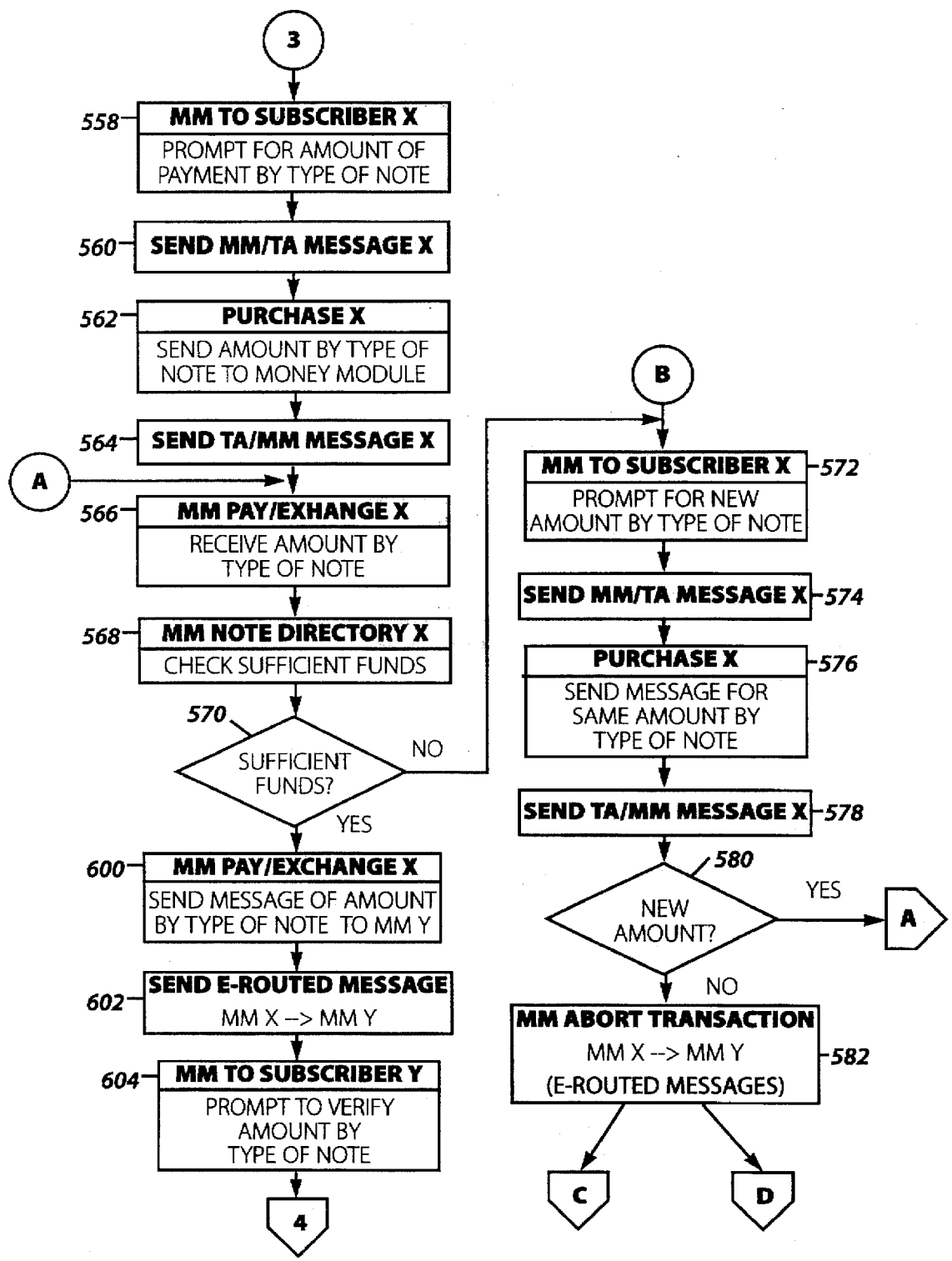
Figure 12D:
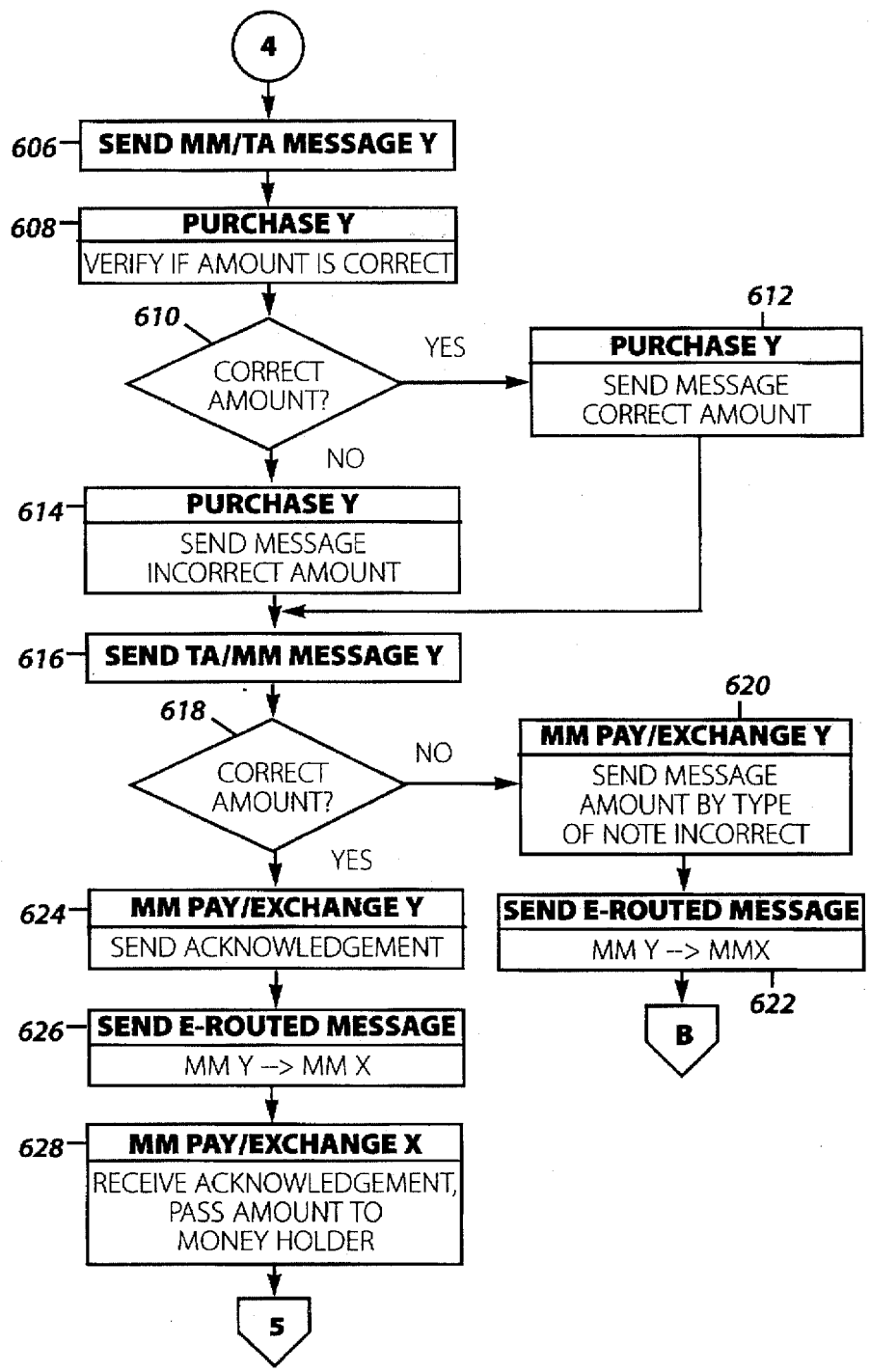
Figure 12E:
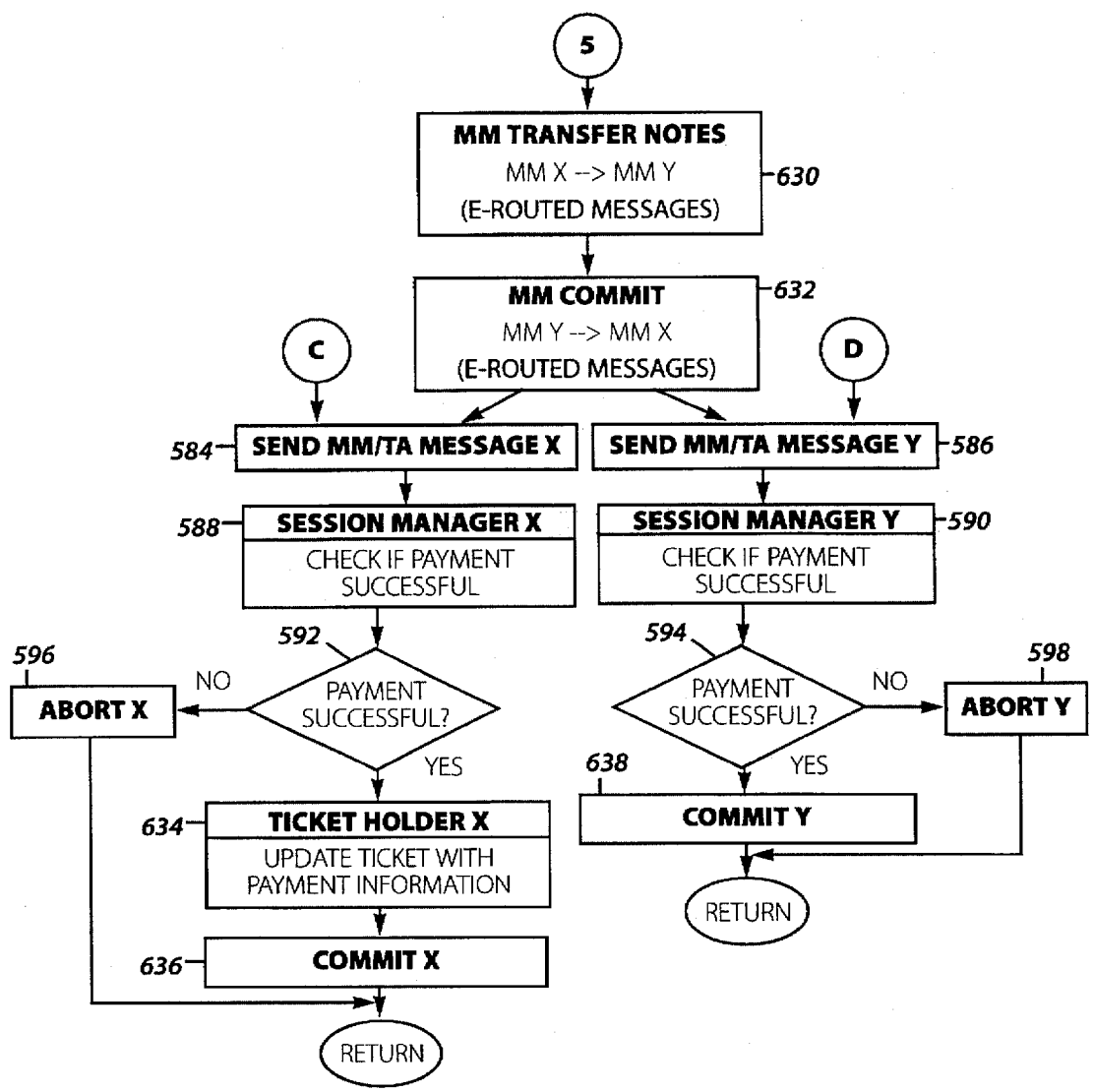

If the merchant's credential is not valid, then the transaction is aborted by calling the Abort Transaction subroutine (step 458). Referring to FIG. 11, trusted agent A aborts (step 388) and its Session Manager sends a message to trusted agent B's Session Manager informing B that A has aborted (steps 390–394). Trusted agent B then aborts (step 396). Referring back to FIG. 10, if the merchant's credential is valid, then To Host A sends the credential information to a host transfer application for confirmation (e.g., visual confirmation of merchant name by CTD holder) (steps 460–462).

Referring again to FIG. 7, the flow for the purchase/sale of electronic money continues. To Host A requests the amount of electronic money and in which monetary unit (e.g., dollars, yen, pounds, etc.) it wishes to buy or sell (step 714). The customer or a surrogate process enters this information which is received by Purchase A and sent to trusted agent B (steps 716–718).

Purchase B receives the message and checks if it is to receive electronic money (steps 720–722). If so, then it sends a message to trusted agent A requesting a bank credit or debit credential (steps 750–752). Ticket Holder A receives the message and sends a list of possible credentials to HTA (step 754). A credential is picked and the choice is sent to the trusted agent A (step 756). Ticket Holder A then retrieves the selected credit or debit card credential and Purchase A sends it to Trusted Agent B (steps 758–762).

Purchase B then validates the credential as described previously (steps 764–766). If the credential is not valid, then the transaction is aborted. If it is valid, then Ticket Holder B creates an electronic money purchase receipt, and Purchase B sends the receipt to trusted agent A (steps 768–772).

Purchase A receives the receipt and checks if it is valid (steps 774–776). If not valid, then the transaction is aborted (step 778). If it is valid, then Purchase A sends receipt information to the HTA for purchaser confirmation (steps 780–782). If not confirmed, then the transaction is aborted, otherwise, Purchase A sends the receipt to Ticket Holder A (steps 784–786).

Purchase A then sends a message acknowledging receipt to trusted agent B (steps 788–790). Purchase B then checks if electronic money is to be received (steps 792–794). If so, then To Host B sends a message with amount and credential to the card authorization network 208 to credit the bank account identified by the credential (step 796). Following the card authorization process (step 798), Purchase B checks if the credit was authorized (steps 800–802). If not, the transaction is aborted, otherwise Purchase B sends a message to trusted agent A that the credit was authorized (steps 804–806).

Trusted agent A then performs a money module payment to trusted agent B as described in U.S. application Ser. No. 08/234,461. In particular, a Money Module Payment subroutine is called (step 808). Referring to FIG. 12, Random Number Generator A creates random number R(1) (step 520). Purchase A then sends a message to trusted agent B indicating that a "money module payment" will be made and also containing R(1) (step 522–524). Purchase B receives the message and sends R(1) to Security Manager B (steps 526–528). Random Number Generator B creates random number R(2) and sends it to trusted agent A (steps 530–532). Security Managers A and B both form session key (TA/MM) by exclusive ORing R(1) and R(2) (Steps 534–536).

Figure 13:
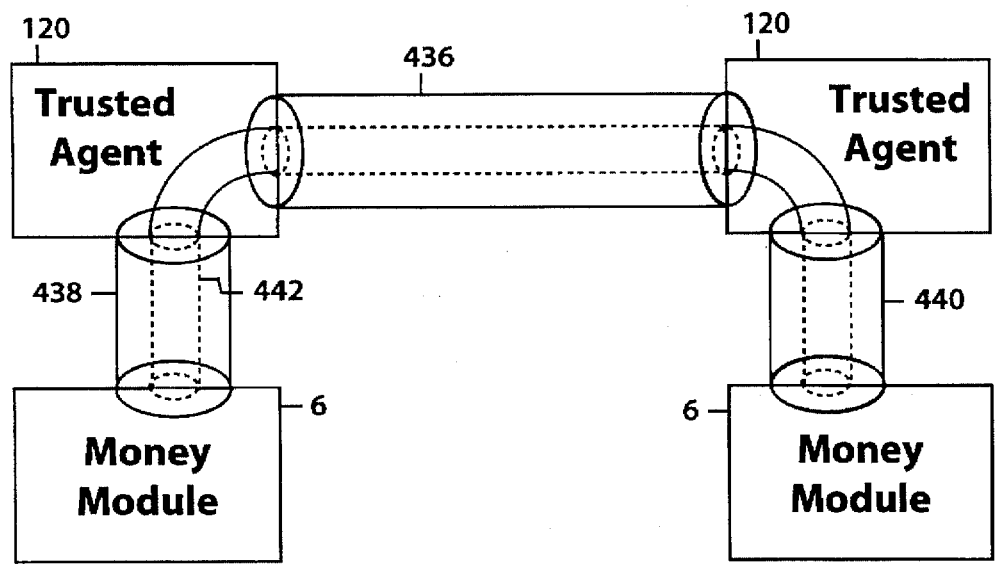
FIG. 13 shows the various message encryption layers established among trusted agents and money modules.
Figure 14A:
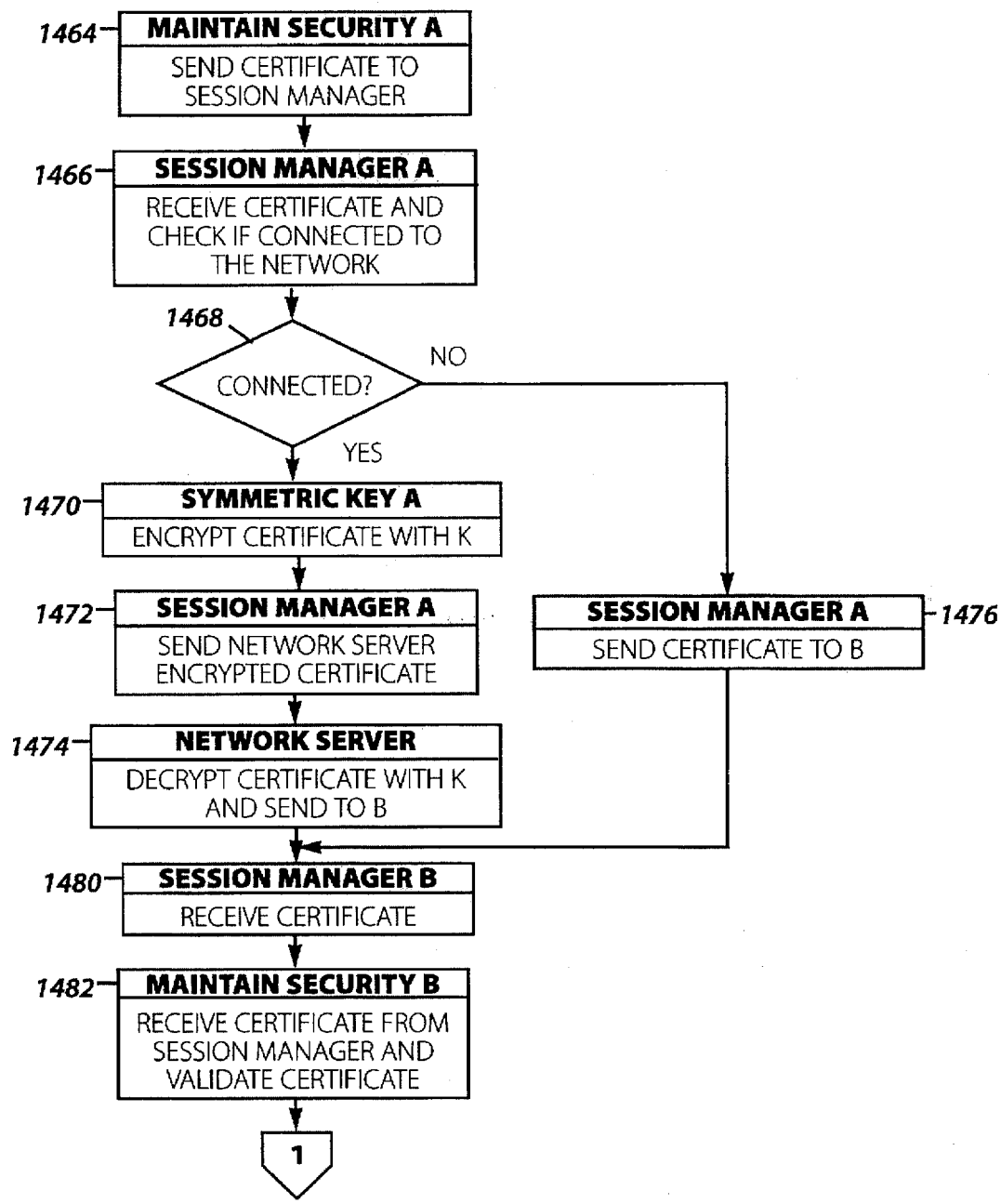
FIGS. 14A–14E illustrate an Establish Session protocol for money modules.
Figure 14B:
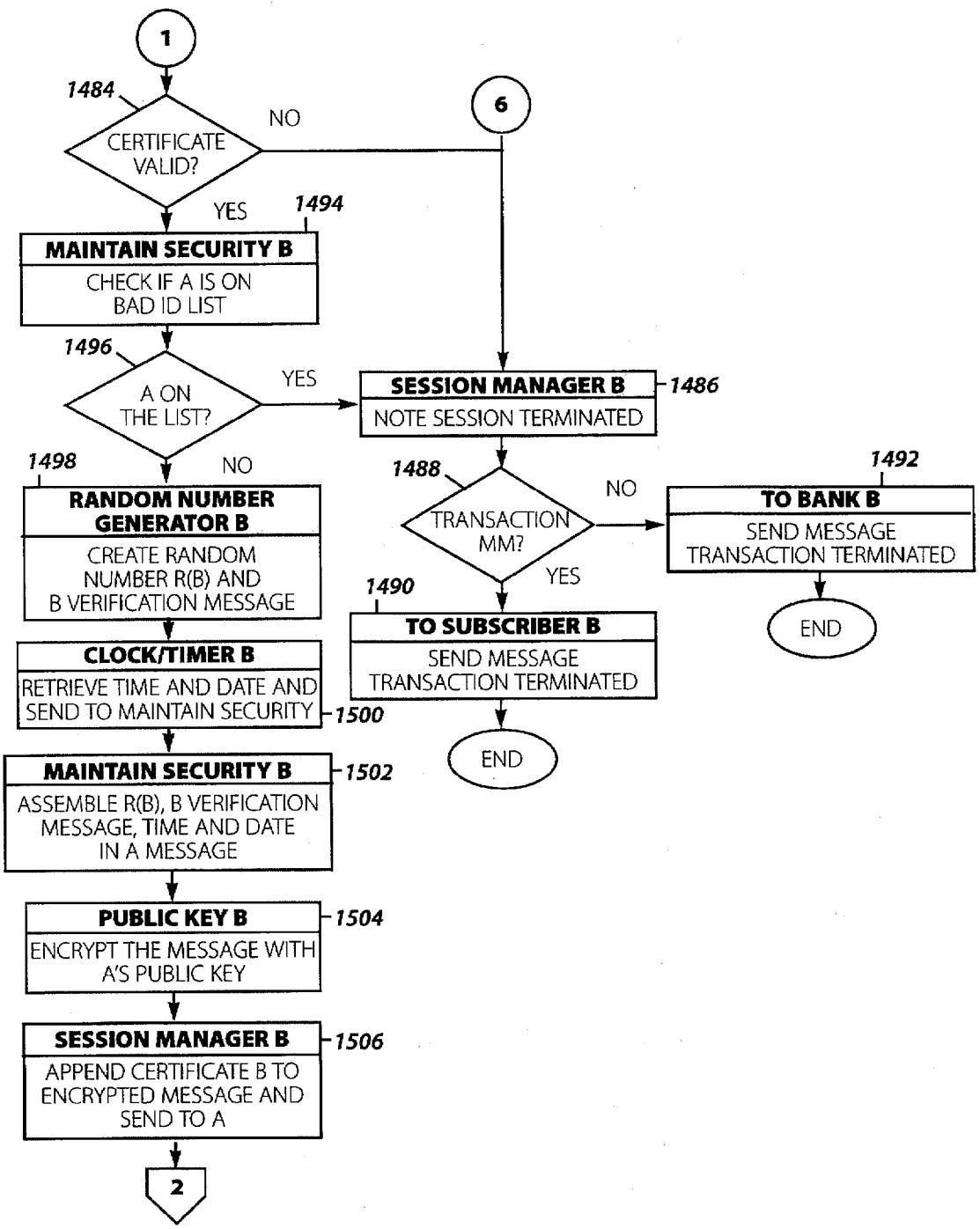
Figure 14C:
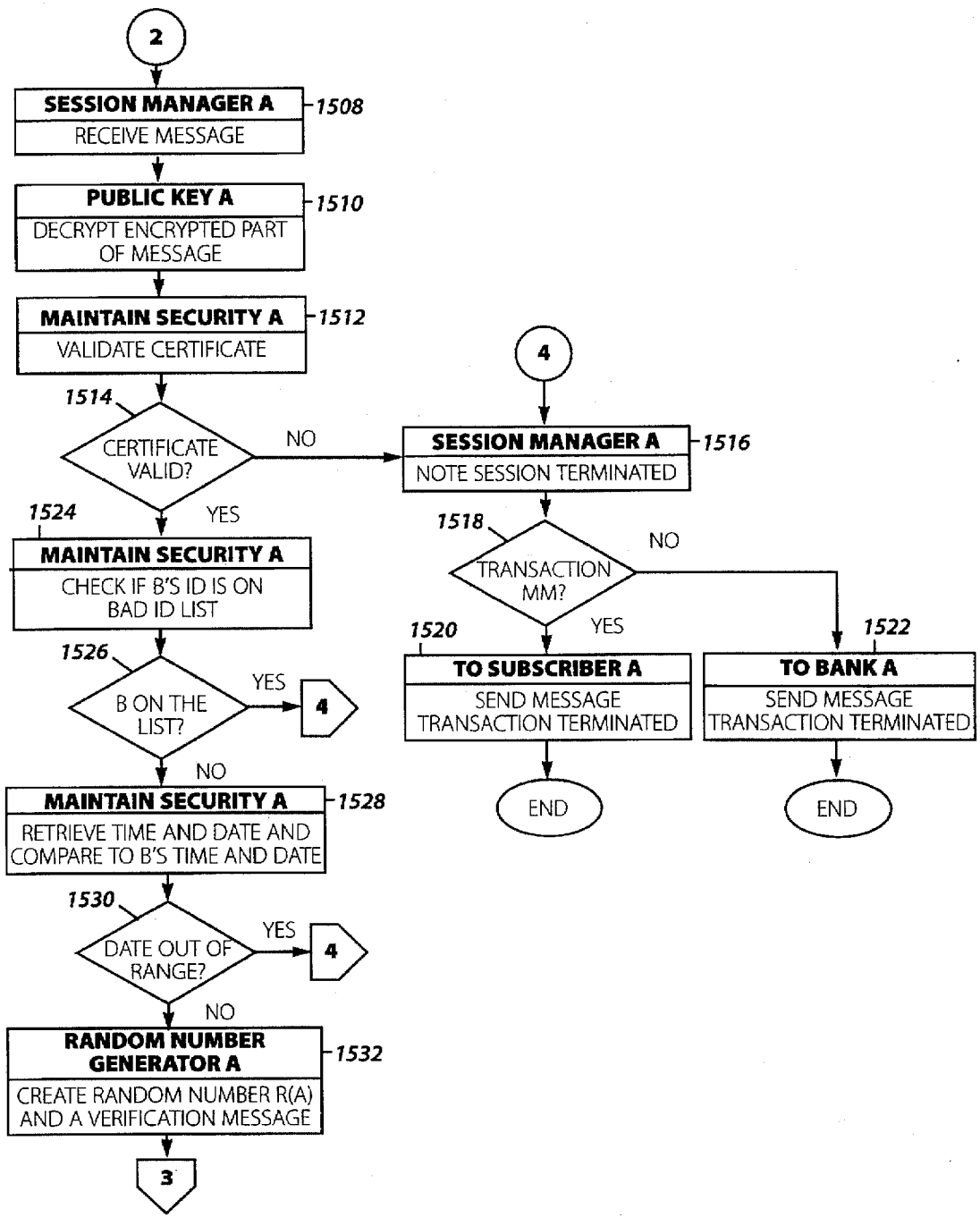
Figure 14D:
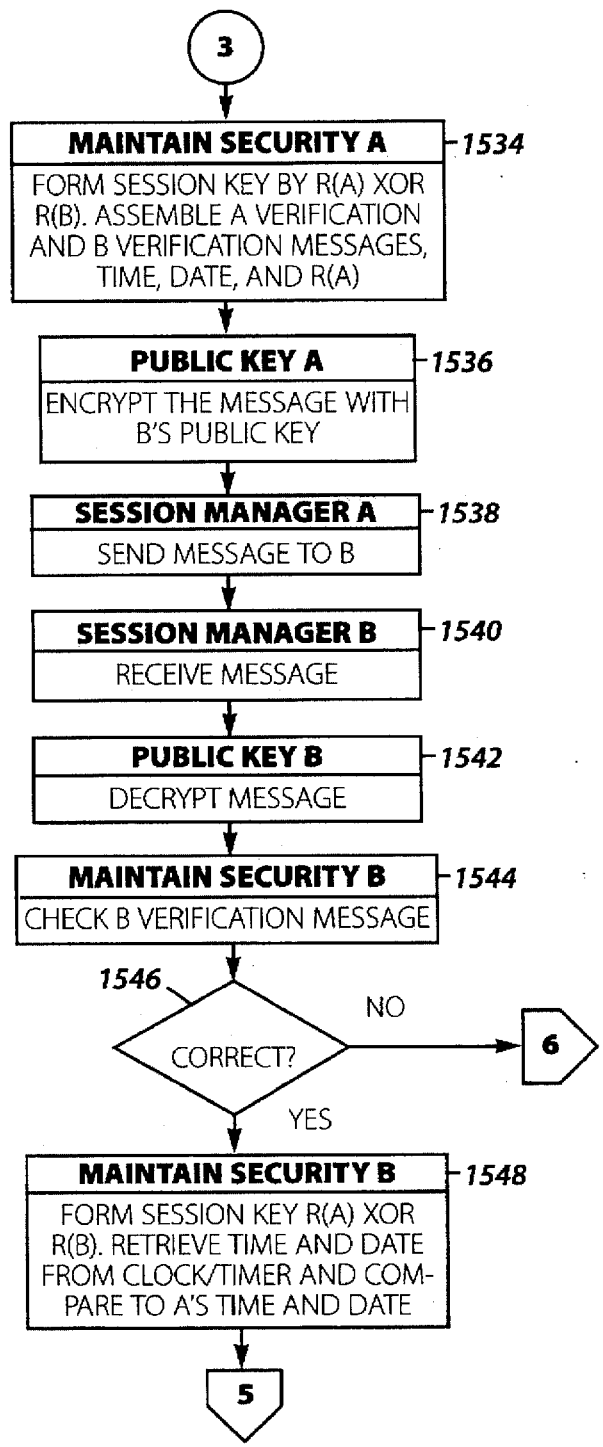
Figure 14E:
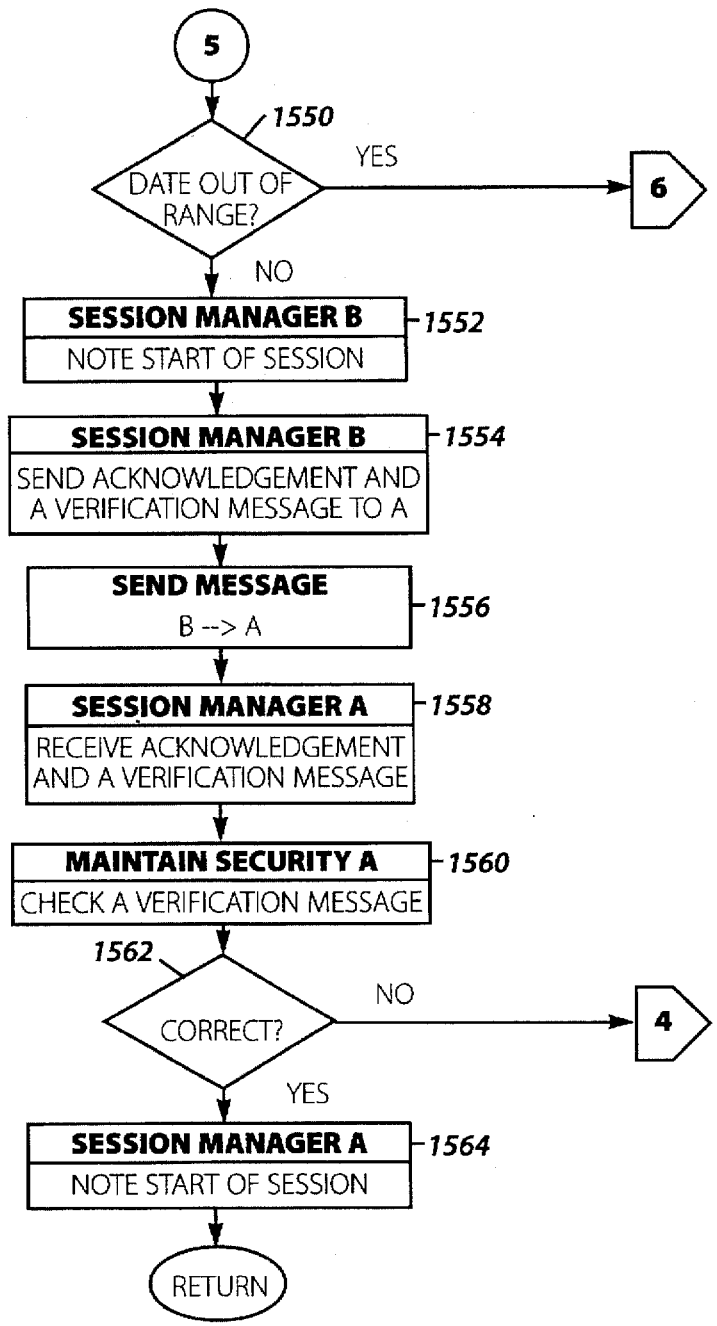

Referring to FIG. 13, there is shown four encryption channels established during a transaction. Encryption channel 436 between the two trusted agents 120 carries messages encrypted by session key (TA/TA). Channels 438 and 440 between a trusted agent 120 and its money nodule 6 share session key (TA/MM). Channel 442 between money modules 6 in different transaction devices 122 use session key (MM/MM).

Session key (TA/MM) is used for encrypting messages sent between a trusted agent 120 and its associated money module 6 via encryption channels 438 and 440. At the present point in the flow diagram, only the two trusted agents 120 have session keys (TA/MM). Both money modules 6 will later in the flow diagram form copies of session key (TA/MM) so as to enable encrypted communication between the trusted agents 120 and their money modules 6.

It may be noted that instead of the trusted agent 120 and money module 6 being embodied as discrete tamper-proof components, they may be fabricated as one tamper-proof module. In this case, it would not be necessary to establish a secure session for communication between trusted agent 120 and money module 6 in the same transaction device 122. However, discrete money modules 6 and trusted agents 120 are preferable in that such a configuration allows for greater application flexibility.

Referring back to FIG. 12, To Money Module A sends a "Make Payment" message and R(1) to its associated money module A. Also, To Money Module B sends a "Receive Payment" message and R(2) to its associated money module B (steps 538–544).

At this stage, money module A (within the CTA 2) and money module B (within the MTA 4) establish a session between them so that each money module 6 winds up holding new session key (MM/MM) (step 546). In establishing this money module to money module session, the money modules exchange messages via the pre-existing trusted agent's session. Referring to FIG. 13, the session key for encryption channel 442 is formed by exchanging messages encrypted by channel 436. After the money module session is established, messages sent between money modules will be encrypted twice, by both session key (MM/MM) and session key (TA/TA), along the portion of the communication path between trusted agents 120.

In the preferred embodiment, the money module session is established in a manner similar to the establishment of a trusted agent session. The money modules 6 would therefore hold their own certificates containing their public keys. The swapping of certificates and random numbers (for XORing) enables the secure creation of session keys (MM/MM). The Establish Session protocol used by money modules is described in U.S. application Ser. No. 08/427,287 and is shown in FIG. 14. Maintain Security A sends the module certificate to the session manager, and Session Manager A receives the certificate and checks if money module A is connected to the network (steps 1464–1466). If money module A is not connected to the network, then Session Manager A sends the certificate received from Maintain Security A to destination B (step 1476).

Alternatively, if money module A is connected to the network, then Symmetric Key A encrypts the certificate with K and Session Manager A sends the encrypted certificate to the network server (step 1468–1472). The Network Server decrypts the certificate with K and sends the certificate to destination B.

Regardless of whether the certificate was sent by the Network Server or by Session Manager A, Session Manager B receives the certificate and Maintain Security B (if B is a security server, then this function is performed by the Session Manager) validates the certificate (steps 1480–1482). If the certificate is not valid, then Session Manager B notes the session is terminated and informs either the subscriber or the bank (steps 1486–1492) (if B is a security server, then B merely notes the transaction is terminated).

If the certificate is valid, then Maintain Security B checks if A is on the bad id list (steps 1494–1496). If A is on the list, then the session is terminated. If A is not on the list, then Random Number Generator B creates random number R(B) and a B verification message (step 1498). Clock/Timer B retrieves the time and date (step 1500). Maintain Security B assembles R(B), B verification message and time and date in a message (step 1502). Public Key B encrypts the message with A's public key and Session Manager B appends B's certificate to the encrypted message and sends the message to A (steps 1504–1506).

Session Manager A receives the message, Public Key A decrypts the encrypted part of the message, and Maintain Security A validates B's certificate (steps 1508–1514). If the certificate is not valid, then Session Manager A notes the termination of the session and informs either the subscriber or the bank (steps 1516–1522). If the certificate is valid, then Maintain Security A checks if B is on the bad id list (steps 1524–1526). If B is on the list, then the session is terminated. If B is not on the list, then Maintain Security A retrieves the date and time and compares it to B's date and time (steps 1528–1530). If the date and time are out of range, then the session is terminated.

If the date and time are in range, then Random Number Generator A creates random number R(A) and an A verification message (step 1532). Maintain Security A then forms a session key by the operation R(A) XOR R(B) (step 1534). The A verification message, the B verification message, the time, date and R(A) are assembled into a message and encrypted with B's public key (step 1536). The message is sent to B by Session Manager A (step 1538). Session Manager B receives the message, Public Key B decrypts the message and Maintain Security B checks the B verification message (steps 1540–1546). If the B verification message is incorrect, the session is terminated. If the B verification message is correct, then Maintain Security B forms the session key by R(A) XOR R(B) (step 1548). The time and date are retrieved and compared to A's time and date to check if they are within a predefined range of each other (step 1550). If the time and date are out of range, then the session is terminated. If the time and date are in range, then Session manager B notes the start of the session (step 1552).

Session Manager B then sends an acknowledgement and the A verification message to A (steps 1554–1556). Session Manager A receives the message and Maintain Security A checks the A verification message (steps 1558–1562). If the verification message is not correct, the session is terminated. If the verification message is correct, then Session Manager A notes the start of the session (step 1564).

The overall system security pertaining to the money modules may be integrated with that for the trusted agents 120, but is preferably separate to provide for enhanced system security and system flexibility.

Referring back to FIG. 12, money module A sends R(1) to money module B. This function may be initiated by a MM Maintain Security A application residing in money module A (step 548). This application and other money module applications are prefaced by the designations "MM" and are described in commonly assigned U.S. patent application Ser. No. 07/794,112 together with any modifications and/or additions disclosed in U.S. application Ser. No. 08/234,461.

Figure 15:
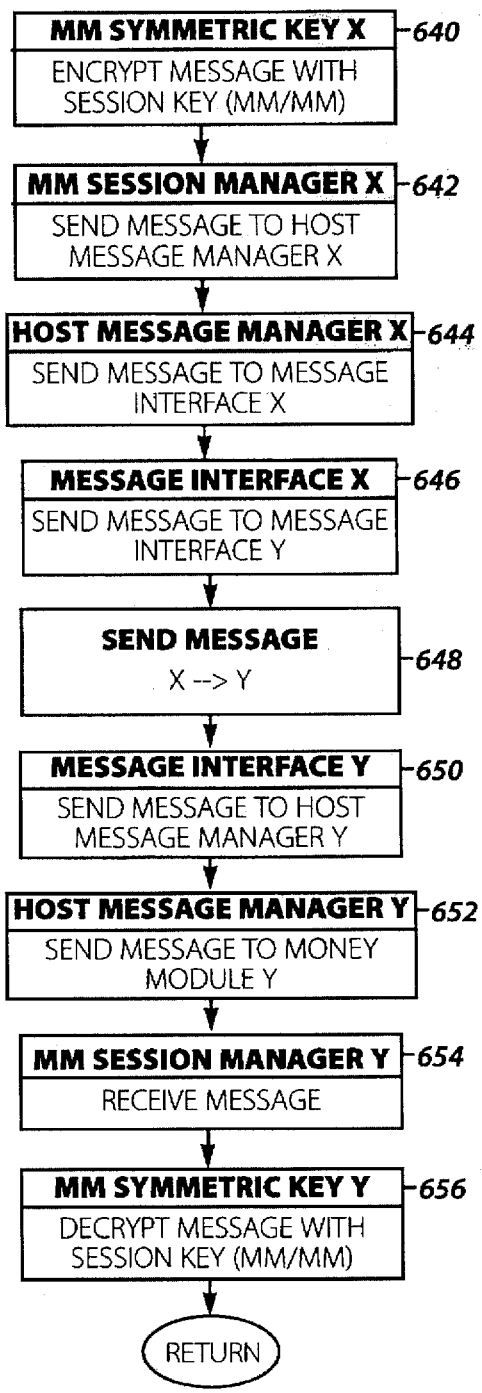
FIG. 15 illustrates a Send Routed Message protocol.

Random number R(1) is sent from money module A to money module B by the subroutine Send Routed Message (step 550). Referring to FIG. 15, MM Symmetric Key A encrypts the message (including R(1)) with session key (MM/MM) (step 640). MM Session Manager A sends the message to Host Message Manager A which, in turn, sends the message to Message Interface A of trusted agent A (steps 642–646). Trusted agent A then sends the message to Message Interface B of trusted agent B using the Send Message subroutine (step 648) which encrypts and decrypts the message with session key (TA/TA) in between the trusted agents. Message Interface B then sends the message to MM Session Manager B in money module B via Host Message Manager B (steps 650–654). Finally, MM Symmetric Key B decrypts the message with session key (MM/MM) (step 656).

Referring again to FIG. 12, MM Maintain Security B (in money module B) forms session key (TA/MM) by exclusive ORing R(1) and R(2). Money module B then sends R(2) to money module A which also forms session key (TA/MM) by exclusive ORing R(1) and R(2) (Steps 552–556). Referring to FIG. 13, at this stage, three session keys exist: (MM/MM), (MM/TA), and (TA/TA). Thus, the four encryption channels shown are in place.

Referring to FIG. 12, MM To Subscriber A prompts trusted agent A for the amount of payment by type of note (e.g., dollars, yen, pounds, etc.) (step 558). A money module as described in U.S. patent application Ser. No. 07/794,112, incorporated by reference herein, would generally use the To Subscriber application for communication with the owner/holder of the money module. However, as used in the present instance, the To Subscriber application communicates with the trusted agent 120 for getting various instructions. Here, the trusted agent 120 delivers amount of payment and type of note information (trusted agent A has previously communicated with the owner/holder of the CTD 2 to determine the amount).

Figure 16:
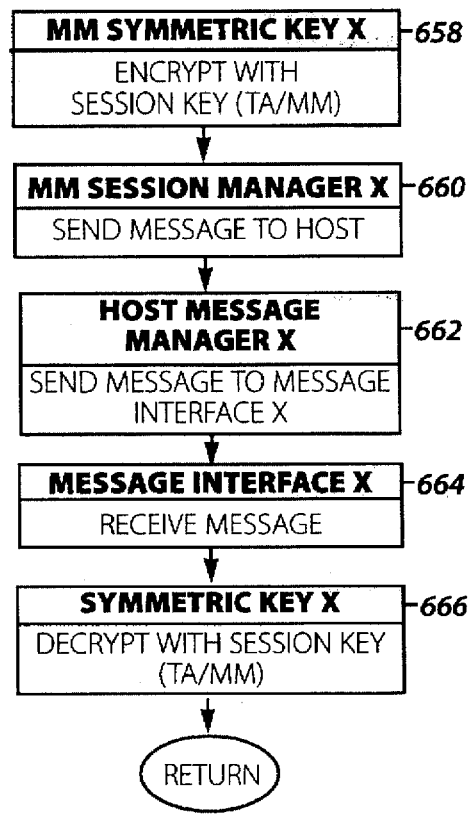
FIG. 16 illustrates a Send MM/TA Message protocol.
Figure 17:
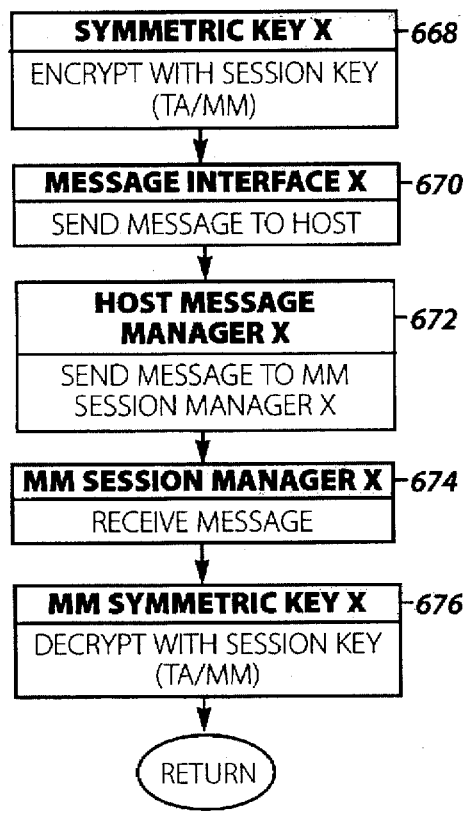
FIG. 17 illustrates a Send TA/MM Message protocol.

The prompt from the money module 6 to the trusted agent 120 is sent via the Send MM/TA Message subroutine (step 560). Referring to FIG. 16, MM Symmetric Key A encrypts the message with session key (TA/MM) (step 658). MM Session Manager A sends the message to trusted agent A's Message Interface via Host Message Manager A (steps 660–664). Symmetric Key A decrypts the message with session key (TA/MM) (step 666). Referring back to FIG. 12, Purchase A of trusted agent A sends the amount (price of selected merchandise) by type of note to MM Pay/Exchange A of money module A (steps 562–566). This message is sent via the Send TA/MM Message subroutine (step 564). Referring to FIG. 17, Symmetric Key A encrypts the message with session key (TA/MM) (step 668). Message Interface A sends the message to money module A's MM Session Manager via Host Message Manager A (steps 670–674). Finally, MM Symmetric Key A decrypts the message with session key (TA/MM) (step 676).

Referring to FIG. 12, MM Note Directory A checks if the money module 6 has sufficient funds to cover the payment (steps 568–570). If insufficient, then money modules A and B abort the transaction (steps 572–582).

Figure 18A:
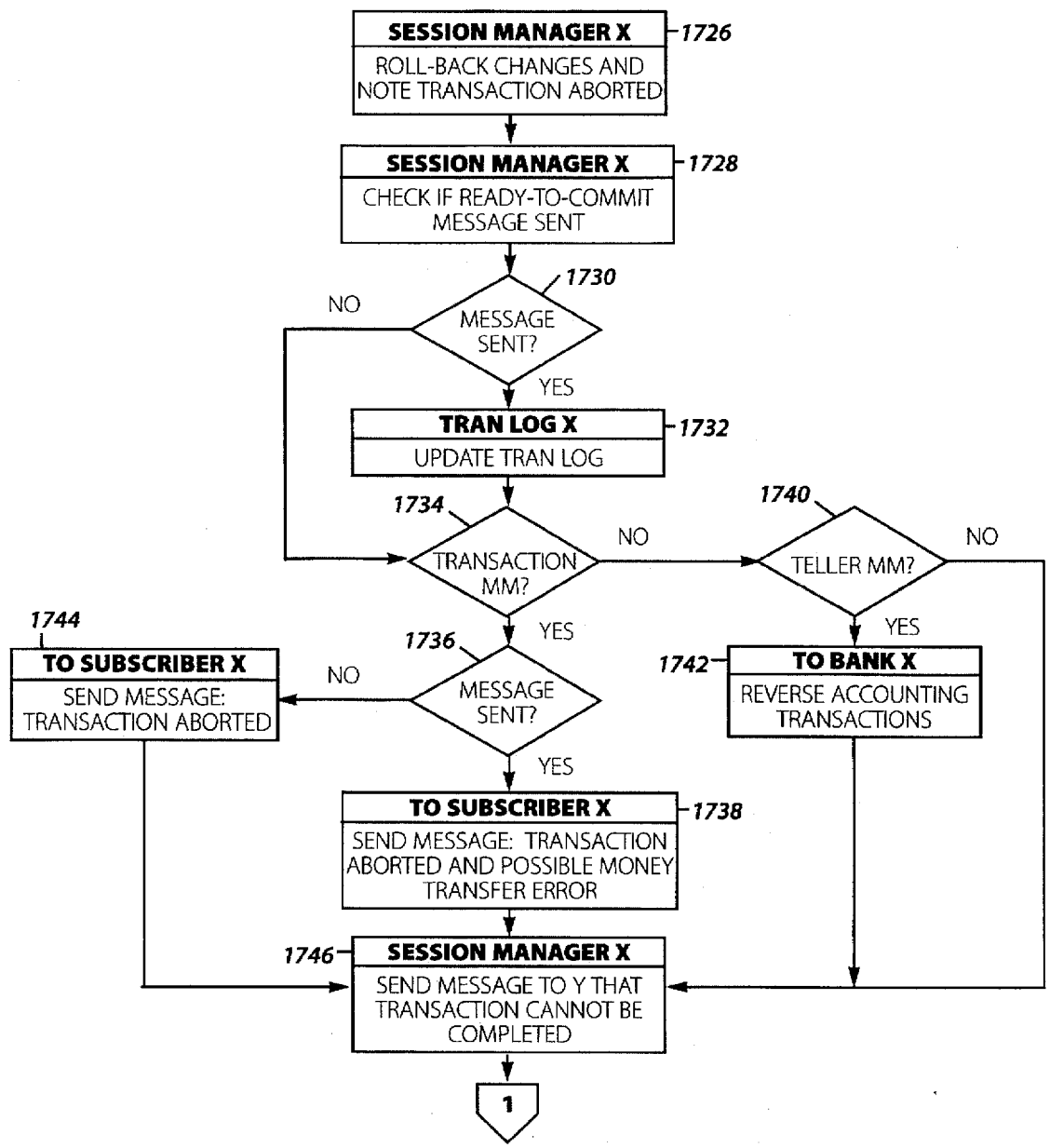
FIGS. 18A–18B illustrate an Abort Transaction protocol for money modules.
Figure 18B:
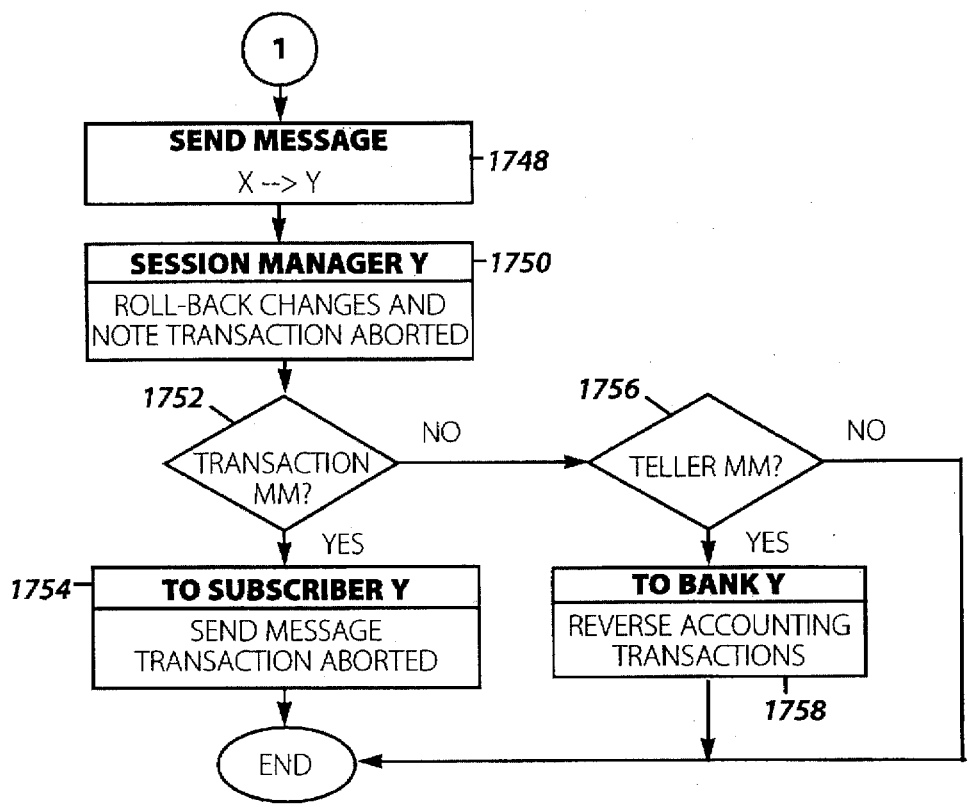

The MM Abort transaction protocol (step 582) may be that of the preferred electronic monetary system as described in U.S. application Ser. No. 08/427,287 and shown in FIG. 18. Session Manager X rolls-back changes and notes that the transaction is aborted (step 1726). Session Manager X then checks if the "Ready-to-Commit" message has been sent (steps 1728–1730). If so, then X updates its transaction log (step 1732) by recording that X committed after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734–1738).

If X is a teller money module 1188, then To Bank X informs the bank that it should reverse its accounting transactions (by appropriate debits and credits) (steps 1740–1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746–1748). Session Manager Y rolls-back its changes and notes the transaction as aborted (step 1750). Y then informs its subscriber that the transaction is aborted (steps 1752–1754) or informs the bank to reverse its accounting transaction (steps 1756–1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e, it did not receive the notes sent by A). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

Figure 19:
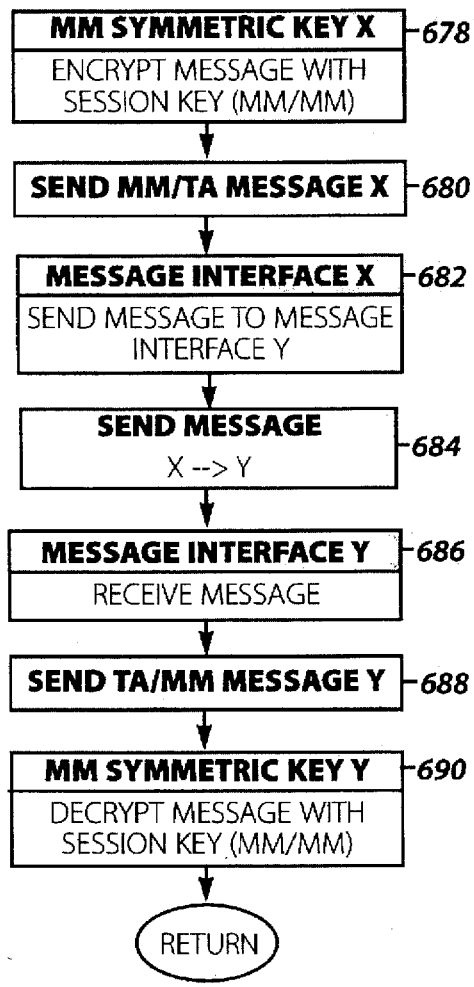
FIG. 19 illustrates a Send E-Routed Message protocol.

Referring again to FIG. 12, the messages between money module A and money module B are sent via a Send E-Routed Message subroutine which utilizes all three session keys (MM/MM), (TA/MM), and (TA/TA). Referring to FIG. 19, MM Symmetric Key A encrypts a message with session key (MM/MM) (step 678). The message is then double encrypted by session key. (MM/TA) before it is sent to trusted agent A. Once received by trusted agent A, the message is decrypted by session key (MM/TA). (Step 680). Message Interface A then sends the message to Message Interface B (steps 682–684). In between trusted agents 120, the message is double encrypted by session key (TA/TA). In like manner, Message Interface B sends the message to MM Symmetric Key B for final decrypting (steps 686–690). FIG. 13 illustrates the various encryption layers.

Referring again to FIG. 12, during the abort routines of money modules A and B (step 582), they generate messages sent to their trusted agents A and B, respectively (steps 584–586) informing them that they have aborted the transaction and hence that payment was unsuccessful. Session Managers A and B note that the payment was unsuccessful and consequently trusted agents A and B abort (steps 588–598).

If, on the other hand, the customer's money module 2 has sufficient funds then MM Pay/Exchange A sends a message to the merchant's money module containing the amount of money to be transferred in payment and the type of notes (step 600). This message is sent by the Send E-Routed Message subroutine (step 602).

Money module B receives the message containing the payment amount according to money module A. MM To Subscriber B then sends a prompt to trusted agent B to verify this payment amount (steps 604–606). Accordingly, Purchase B in trusted agent B verifies if the amount is correct (steps 608–610). If correct, then trusted agent B sends a "Correct Amount" message to money module B. If incorrect, then an "Incorrect Amount" message is sent. (Steps 612–616). In the event of an "Incorrect Amount" message, money module B informs money module A which, in turn, requests its trusted agent to resend a new amount or else abort (steps 618–622, 572–582). In money module payments made during an electronic merchandise purchase, the trusted agent will not send a new amount and hence both money modules 6 and both trusted agents 120 will abort.

If, on the other hand, money module B receives a "Correct Amount" message from its trusted agent, then money module B sends an Acknowledgement message back to the customer's money module (steps 624–626). When MM Pay/Exchange A receives the Acknowledgement message, it then passes the amount to Money Holder A (the application which contains and manages the electronic representations of money) (step 628).

Note that the payor initiated protocol just described may instead be implemented as a payee initiated payment as in the POS Payment protocol. In such a protocol, the merchant's trusted agent instructs its money module as to the payment amount it expects to receive, this payment information is sent to the customer's money module which prompts its trusted agent for verification, and if the amount is correct, then the customer's trusted agent informs its money module.

Figure 20A:
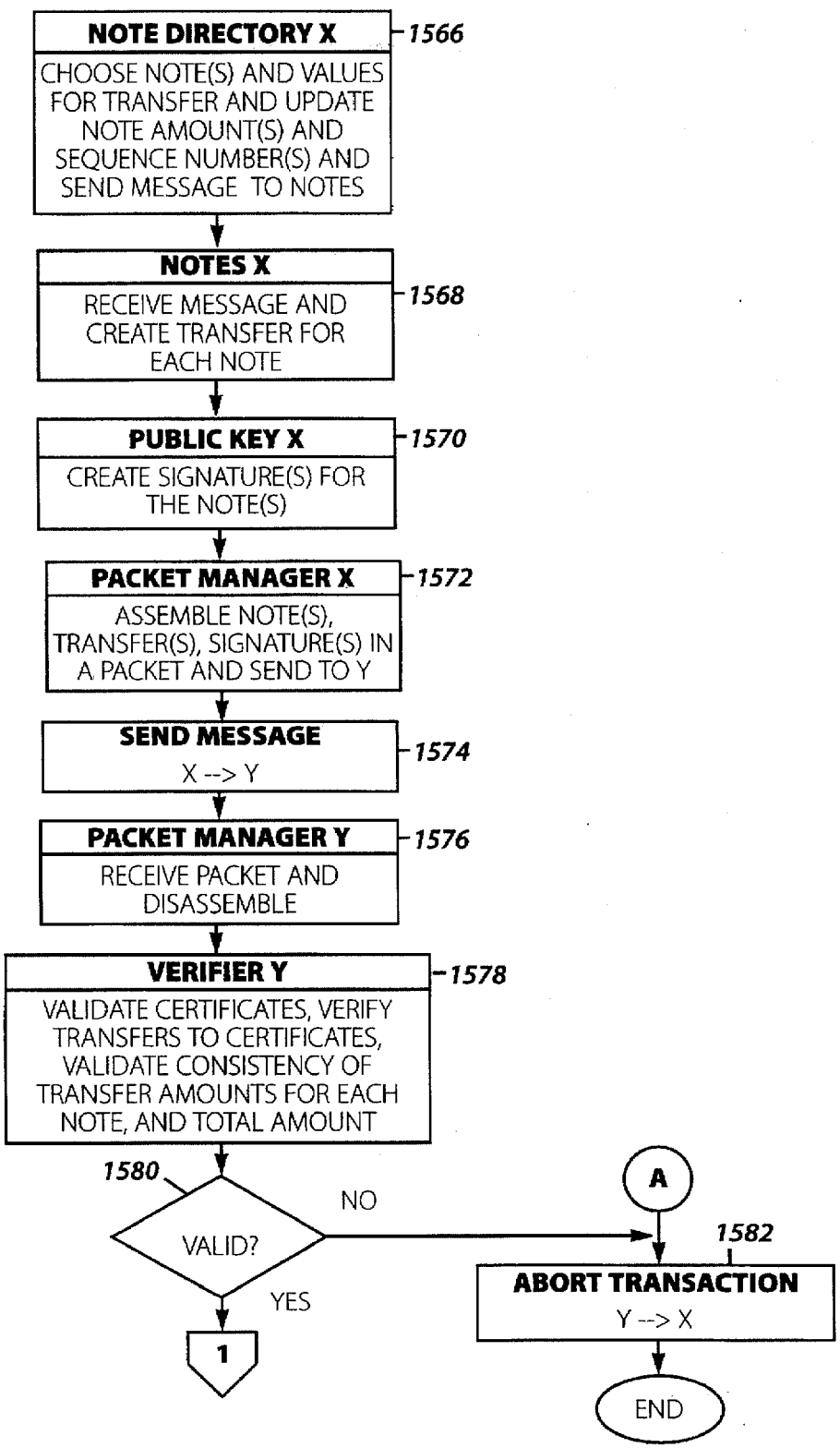
FIGS. 20A–20B illustrate a Transfer Notes protocol.
Figure 20B:
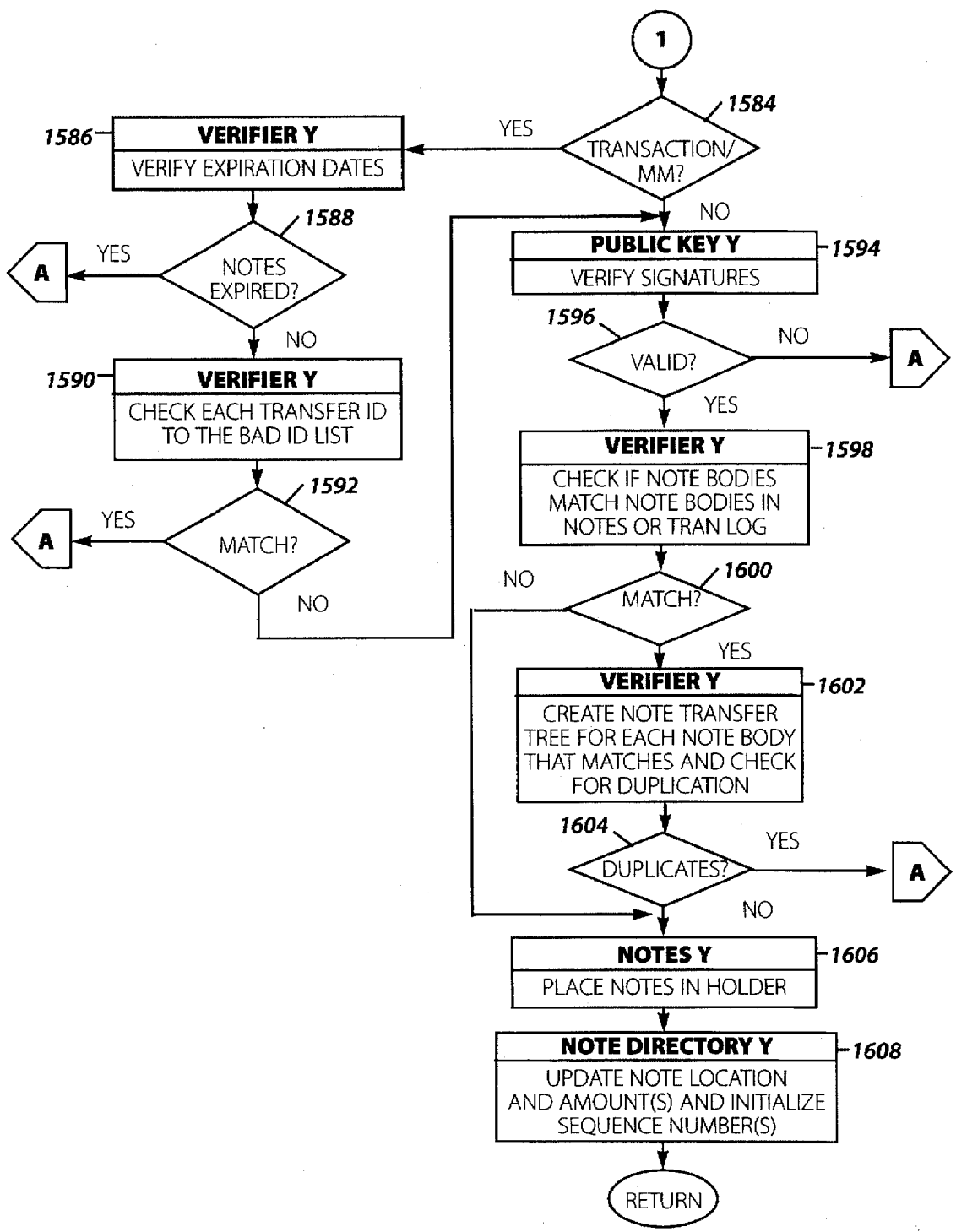

Referring again to FIG. 12, the customer's money module A then transfers electronic notes in the amount specified to the merchant's money module 4 via the E-Routed message path (step 630). FIG. 20 shows a Transfer Notes protocol as described in U.S. application Ser. No. 08/427,287. Note Directory X chooses the note(s) and values for transfer, updates the note amount(s) and sequence number(s), and then sends the message to Notes (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2) determine which of these alternatives have the least number of transfers; (3) if more than one choice is left from step 2, choose the one which has the least number of monetary unit days. Monetary-unit days= residual value of note to be transferred times the number of days left until the note expires, summed for all the notes in the packet.

Notes X, upon receiving the message from Note Directory X, creates a transfer to be appended to each note being transferred (step 1568). Public Key X creates signatures for the note(s) (step 1570). Packet Manager X then assembles the note(s) with their new transfer(s) and signature(s) in a packet and sends the packet to Y (steps 1572–1574). Packet Manager Y receives the packet and disassembles it (step 1576).

Verify Y validates all certificates in the note(s) (e.g., money generator certificate and all transfer certificates). Then Verify Y verifies that the identification numbers in the transfer group match up with the module identification numbers of the certificates in the signature and certificate group throughout the history of the electronic note. Also, the consistency of the transfer amounts for each note is validated by ensuring that throughout the electronic note history the amount transferred in each successive transfer is less than that of the immediately precedent transfer. In addition, the total amount transferred is checked to ensure it is the amount expected. (Steps 1578–1580). If not valid, then the transaction is aborted (step 1582).

If valid and Y is a transaction money module, then Verifier Y verifies the expiration dates of the note(s) (steps 1584–1588). If any of the note(s) have expired, then the transaction is aborted. If none have expired, then Verifier Y checks each id from the note transfers against the bad id list (steps 1590–1592). If any of the transfer id's are on the bad id list, then the transaction is aborted.

If the transfer id's are not on the bad id list (or Y is not a transaction money module), then Public Key Y verifies the validity of the note(s) signatures (steps 1594–1596). If any of the signatures are not valid, then the transaction is aborted. If the signatures are valid, then Verifier Y checks if the note(s) bodies match note bodies that are stored by the Notes application or located in the Tran Log (steps 1598–1600). For each note body that matches, a note transfer tree is created in order to determine whether there has been any note duplication (steps 1602–1604). If any of the notes have been duplicated, then the transaction is aborted. This check for duplication (i.e., steps 1598–1604) is particularly directed to, and well suited for, thwarting individuals who attempt to create money by transferring notes by "self-dealing" using a compromised transaction money module.

If there are no duplicates, or if no matches of note bodies were identified, then Notes Y places the note(s) in the money holder (step 1606). Finally, Note Directory Y updates the note(s) location(s) and amount(s), and also initializes sequence number(s) (step 1608).

It may be understood that the Transfer Notes process includes steps for updating and initializing a sequence number to facilitate note reconciliation, checking if the transferee of any note is on the bad id list, and checking for note duplication. These additional features and steps make it difficult for adversaries to introduce and circulate duplicated notes, and enhance the ability to detect duplicated notes in circulation.

Figure 21:
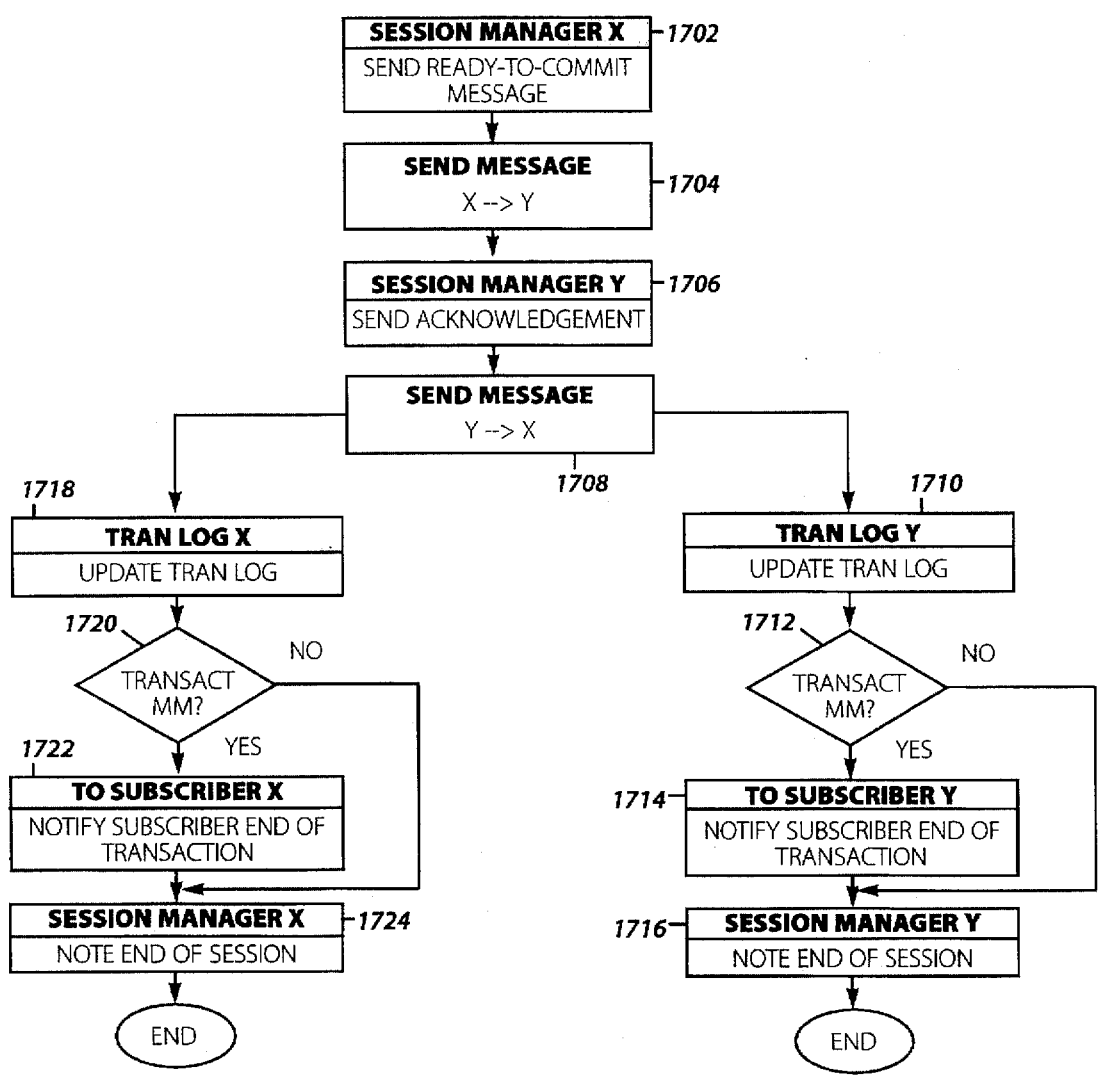
FIG. 21 illustrates a Commit protocol for money modules.

Referring back to FIG. 12, a MM Commit subroutine is called (step 632). A Commit protocol as used in the preferred electronic monetary system is described in U.S. application Ser. No. 08/427,287 and shown in FIG. 21. Session Manager X sends a "Ready-to-Commit" message to Y (steps 1702–1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706–1708) and commits to any outstanding transactions by updating its transaction log (step 1710). Also, if Y is a transaction money module, then To subscriber Y notifies the subscriber of the successful transaction (steps 1712–1714). Session Manager Y notes the end of the session (step 1716).

Tran Log X receives the acknowledgement from Y and updates its transaction log, thus committing to any outstanding transfers. X completes its commit in the same manner as Y (steps 1718-1724).

This flow diagram is still followed when money modules 6 are interacting with trusted agents 120 with the understanding that Send Message=Send E-Routed Message and that To Subscriber messages are actually sent encrypted to the trusted agent 120. With the foregoing in mind, money module B's MM Session Manager sends a "Ready-To-Commit" message to money module A's MM Session Manager via the send E-Routed Message subroutine (steps 1702-1704). MM Session Manager A then sends an "Acknowledgement" message to money module B and money module A commits (steps 1706-1716). When money module B receives the "Acknowledgement" message it too commits (steps 1718-1724).

During the commit routines of money modules A and B, they generate messages sent to their trusted agents A and B, respectively (steps 1714, 1722) informing them that they have committed to the transaction and hence that the payment was successful.

Referring again to FIG. 12, the money modules then both send the aforementioned "Payment Successful" messages to their trusted agents (steps 584-586). These messages are encrypted by session key (TA/MM). Session Manager A detects that a successful payment has been made and Ticket Holder A updates the receipt ticket with payment information such as the date of transaction (steps 588, 592, 634). Trusted agent A then commits (step 636) so that its retention of the ticket is no longer "provisional". Similarly, Session Manager B detects a successful payment (steps 590, 594) and trusted agent B commits (step 638). The transaction is now complete.

Referring back to FIG. 7, the previous discussion described the situation where a customer wished to sell electronic money to a merchant in exchange for a debit to his bank account. In the case where the customer wants to receive electronic money from the merchant, Purchase B queries the money module for sufficient funds (steps 724-726). If the money module within the MTD has insufficient funds, then To Host B requests guidance from the host which checks if other of the merchant's transaction devices have the requested amount (steps 728-732). If yes, then Host B sends a message to this other transaction device (having a Host C) to send money (step 734). A session is established between C and B and a money module payment is made (steps 736-738). It may be noted that in this scenario there is no ticket as indicated in step 634 of the money module payment. This step may simply be skipped under this circumstance.

If no other MTD has sufficient funds, then Host B checks if it can withdraw the amount from a bank where it has an account (steps 740-742). If so, then money module A withdraws electronic money from the bank (step 748) using the money generator module 202, teller module 204, and banking system 206, as described in U.S. application Ser. No. 07/794,112. If no electronic money can be withdrawn, then Host B requests an abort, and the transaction is aborted (steps 744-746).

At the point where the merchant has sufficient funds to distribute to the customer, the transaction proceeds as described in steps 750-794. To Host B then sends a message with the amount and credential to the card authorization network 208, to debit the bank account identified by the credential (step 810). The card authorization process proceeds (step 811) and Purchase B checks if the debit has been authorized (steps 813-815). If not authorized, then the transaction is aborted, otherwise trusted agent B makes a money module payment to trusted agent A completing the transaction (step 817).

In this disclosure, there is shown and described the preferred embodiment of the invention, it being understood that the invention is capable of use in various other combinations and environments and is capable of changes or modifications within the scope of the inventive concepts as expressed herein.

I claim:

1. A system for the open distribution of electronic money comprising:

a tamper proof customer trusted agent;

a tamper proof first money module associated with said customer trusted agent that securely communicates with said customer trusted agent;

a tamper proof merchant trusted agent that establishes a first cryptographically secure session with said customer trusted agent;

a tamper proof second money module associated with said merchant trusted agent that securely communicates with said merchant trusted agent, and that establishes a second cryptographically secure session with said first money module;

where said customer trusted agent provides electronic money purchase information and an account credential to said merchant trusted agent, and said merchant trusted agent provides a receipt ticket to said customer trusted agent;

where said merchant trusted agent accesses an authorization network and initiates an authorization process using information from said electronic money purchase information and said account credential;

where upon receiving authorization, said merchant trusted agent initiates a transfer of electronic money from said second money module to said first money module.

2. The system of claim 1, wherein said account credential is a credit or debit card ticket.

3. The system of claim 1, wherein said customer trusted agent also provides electronic money sale information to said merchant trusted agent, which uses information from said electronic money sale information and said account credential in an authorization process, where upon receiving authorization said merchant trusted agent initiates a protocol where said first money module transfers electronic money to said second money module.

4. The system of claim 1, where said merchant trusted agent initiates the transfer of electronic money to said second money module from another commonly owned money module, and where said electronic money from said another money module is distributed to said first money module.

5. The system of claim 1, wherein said second money module accesses a bank network of a bank providing electronic money, and withdraws electronic money from said bank for distribution to said first money module.

6. The system of claim 1, wherein said receipt ticket includes said customer's bank ID, account number and authorization amount.

7. A system for the open distribution of electronic money comprising:

a tamper proof customer trusted agent;

a tamper proof first money module associated with said customer trusted agent that securely communicates with said customer trusted agent;

a tamper proof merchant trusted agent that establishes a first cryptographically secure session with said customer trusted agent;

a tamper proof second money module associated with said merchant trusted agent that securely communicates with said merchant trusted agent, and that establishes a second cryptographically secure session with said first money module;

where said customer trusted agent provides electronic money sale information and an account credential to said merchant trusted agent, and said merchant trusted agent provides a receipt ticket to said customer trusted agent;

where said merchant trusted agent accesses an authorization network and initiates an authorization process using information from said electronic money sale information and said account credential;

where upon receiving authorization, said customer trusted agent initiates a transfer of electronic money from said first money module to said second money module.

8. The system of claim 7, wherein said account credential is a credit or debit card ticket.

9. The system of claim 7, wherein said receipt ticket includes said customer's bank ID, account number, and authorization amount.

10. A method for open distribution of electronic money utilizing a customer trusted agent, a first money module, a merchant trusted agent, and a second money module, comprising the steps of:

(a) establishing a first cryptographically secure session between said customer trusted agent and said merchant trusted agent;

(b) said customer trusted agent transferring purchase information and an account credential, via said first cryptographically secure session, to said merchant trusted agent;

(c) said merchant trusted agent creating a receipt ticket including, at least in part, said purchase information and said customer's bank account number;

(d) said merchant trusted agent transferring said receipt ticket, via said first cryptographically secure session, to said customer trusted agent which provisionally retains said ticket;

(e) said merchant trusted agent accessing an authorization network and initiating an authorization process using information from said purchase information and said account credential;

(f) establishing a second cryptographically secure session between said first money module and said second money module;

(g) said second money module transferring electronic money, via said second cryptographically secure session, to said first money module which provisionally retains said electronic money;

(h) said first money module committing, whereupon said retention of said electronic money is no longer provisional, and securely informing said customer trusted agent of successful electronic money receipt;

(i) said second money module committing, and securely informing said merchant trusted agent of successful electronic money transfer;

(j) said customer trusted agent committing, whereupon said retention of said receipt ticket is no longer provisional; and (k) said merchant trusted agent committing.

11. The method of claim 10, wherein said account credential is a credit or debit card ticket having said customer's bank account number.

12. The method of claim 10, further including the step of said customer trusted agent verifying said receipt ticket.

13. A method for open distribution of electronic money utilizing a customer trusted agent, a first money module, a merchant trusted agent, and a second money module, comprising the steps of:

(a) establishing a first cryptographically secure session between said customer trusted agent and said merchant trusted agent;

(b) said customer trusted agent transferring electronic money sale information and an account credential, via said first cryptographically secure session, to said merchant trusted agent;

(c) said merchant trusted agent creating a receipt ticket including, at least in part, said electronic money sale information and said customer's bank account number;

(d) said merchant trusted agent transferring said receipt ticket, via said first cryptographically secure session, to said customer trusted agent which provisionally retains said ticket;

(e) said merchant trusted agent accessing an authorization network and initiating an authorization process using information from said electronic money sale information and said account credential;

(f) establishing a second cryptographically secure session between said first money module and said second money module;

(g) said first money module transferring electronic money, via said second cryptographically secure session, to said second money module which provisionally retains said electronic money;

(h) said first money module committing and securely informing said customer trusted agent of successful electronic money transfer;

(i) said second money module committing, whereupon said retention of said electronic money is no longer provisional, and securely informing said merchant trusted agent of successful electronic money receipt;

(j) said customer trusted agent committing, whereupon said retention of said receipt ticket is no longer provisional; and (k) said merchant trusted agent committing.

14. The method of claim 13, wherein said account credential is a debit or credit card ticket having said customer's bank account number.

15. The method of claim 13, further including the step of said customer trusted agent verifying said receipt ticket.

16. A system for the secure distribution of electronic money comprising: tamper-proof first electronic transaction device including a first processor;

a tamper-proof second electronic transaction device including a second processor and that communicates with said first electronic transaction device via a cryptographically secure session;

where said first processor is adapted to transfer purchase amount information and a customer account credential to said second electronic transaction device;

where said second processor incorporates said purchase amount information and information from said customer account credential in a receipt ticket and transfers said receipt ticket, via said cryptographically secure session, to said first electronic transaction device;

where said second processor initiates an authorization process based on said purchase amount information and information from said customer account credential; and where, in the event authorization is received, said second electronic transaction device transfers electronic money to said first electronic transaction device, thereby providing for the distribution of electronic money independent of whether a customer's bank distributes electronic money.

17. The system of claim 16, wherein said second electronic transaction device is connected to a merchant network and an authorization network connected to a customer's bank network; where said authorization process is executed over said authorization network.

18. The system of claim 17, wherein said second electronic transaction device is connected to a merchant's bank network of a bank that distributes electronic money.

19. The system of claim 16, wherein said customer account credential is a debit or credit card ticket having said customer's bank account number.

20. A system for the secure distribution of electronic money comprising:

a tamper-proof first electronic transaction device including a first processor;

a tamper-proof second electronic transaction device including a second processor and that communicates with said first electronic transaction device via a cryptographically secure session;

where said first processor is adapted to transfer electronic money sale information and a customer account credential to said second electronic transaction device;

where said second processor incorporates said electronic money sale information and information from said customer account credential in a receipt ticket and transfers said receipt ticket, via said cryptographically secure session, to said first electronic transaction device;

where said second processor initiates an authorization process based on said electronic money sale information and information from said customer account credential; and where, in the event authorization is received, said first electronic transaction device transfers electronic money to said second electronic transaction device.

21. The system of claim 20, wherein said second electronic transaction device is connected to a merchant network and an authorization network connected to a customer's bank network; where said authorization process is executed over said authorization network.

22. The system of claim 21, wherein said second electronic transaction device is connected to a merchant's bank network of a bank that distributes electronic money.

23. The system of claim 20, wherein said customer account credential is a debit or credit card ticket having said customer's bank account number.

* * * * *